Jan. 8, 1963  H. W. GROTEWOLD  3,072,160
CITRUS FRUIT SEED LOOSENER AND SECTIONIZER
Filed April 23, 1958  17 Sheets-Sheet 5
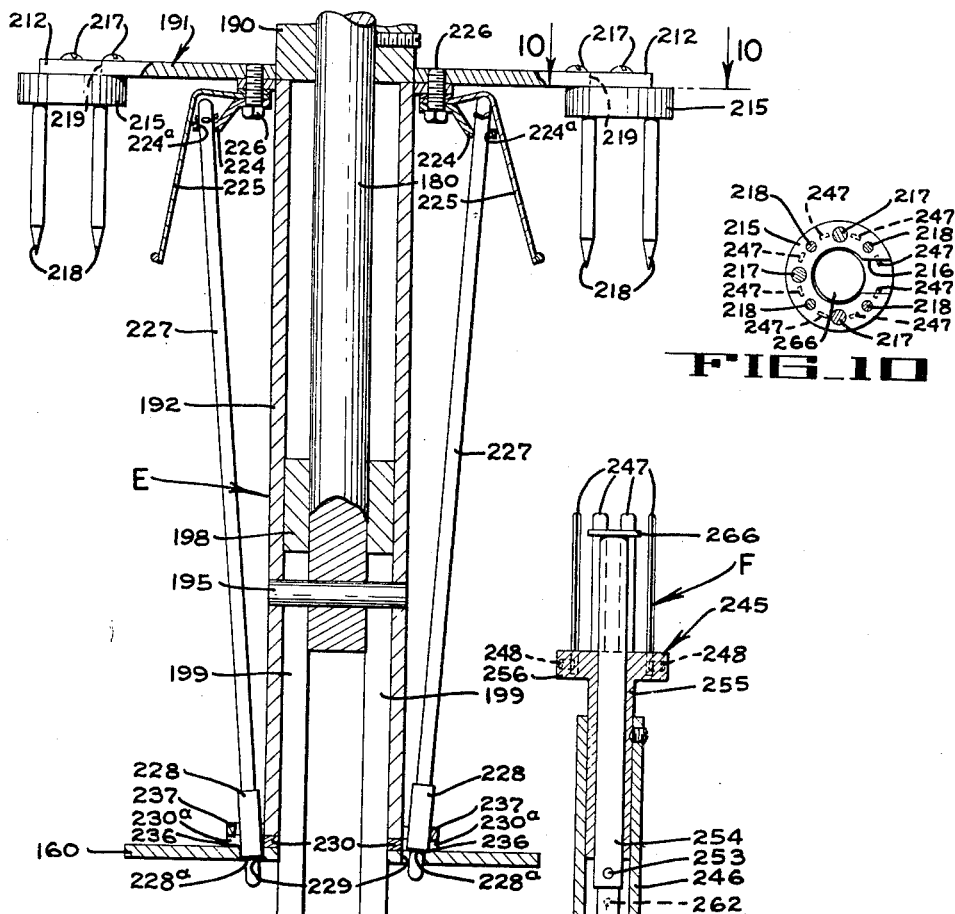
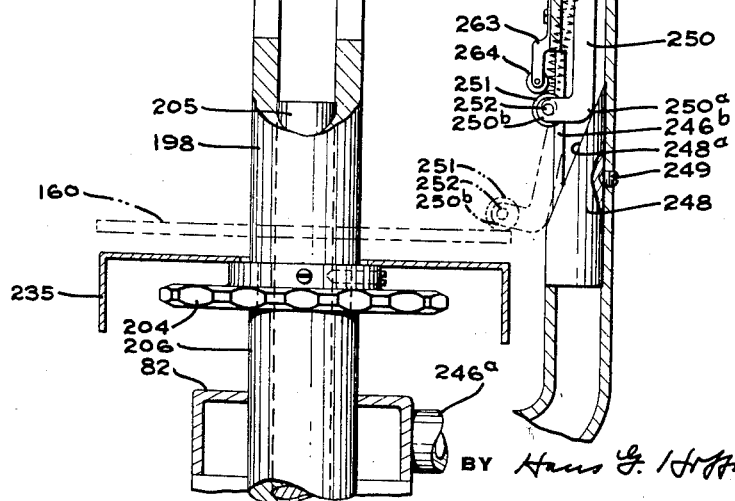
INVENTOR
HANS W. GROTEWOLD
BY *Hans G. Hoffmeister*
ATTORNEY

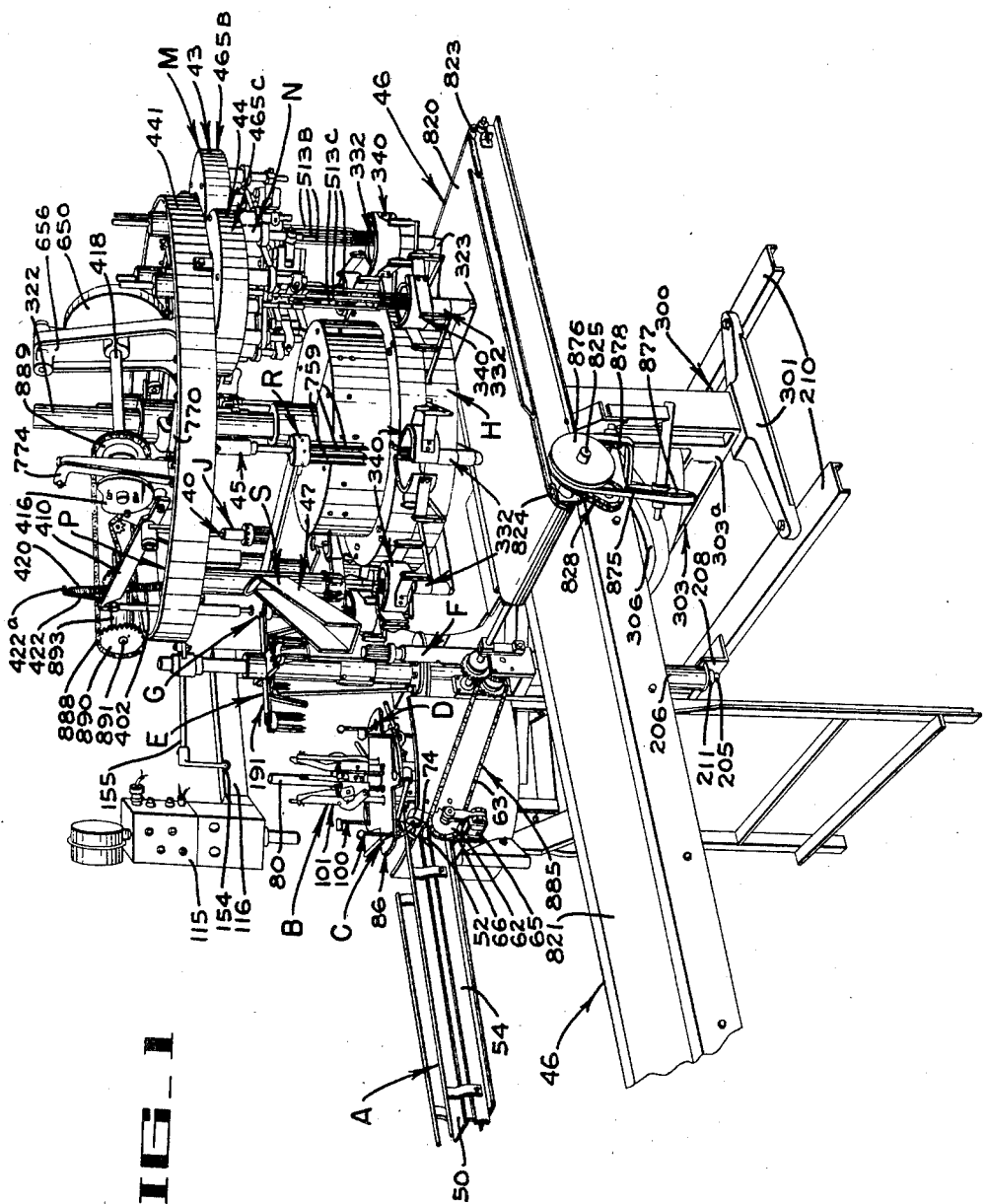

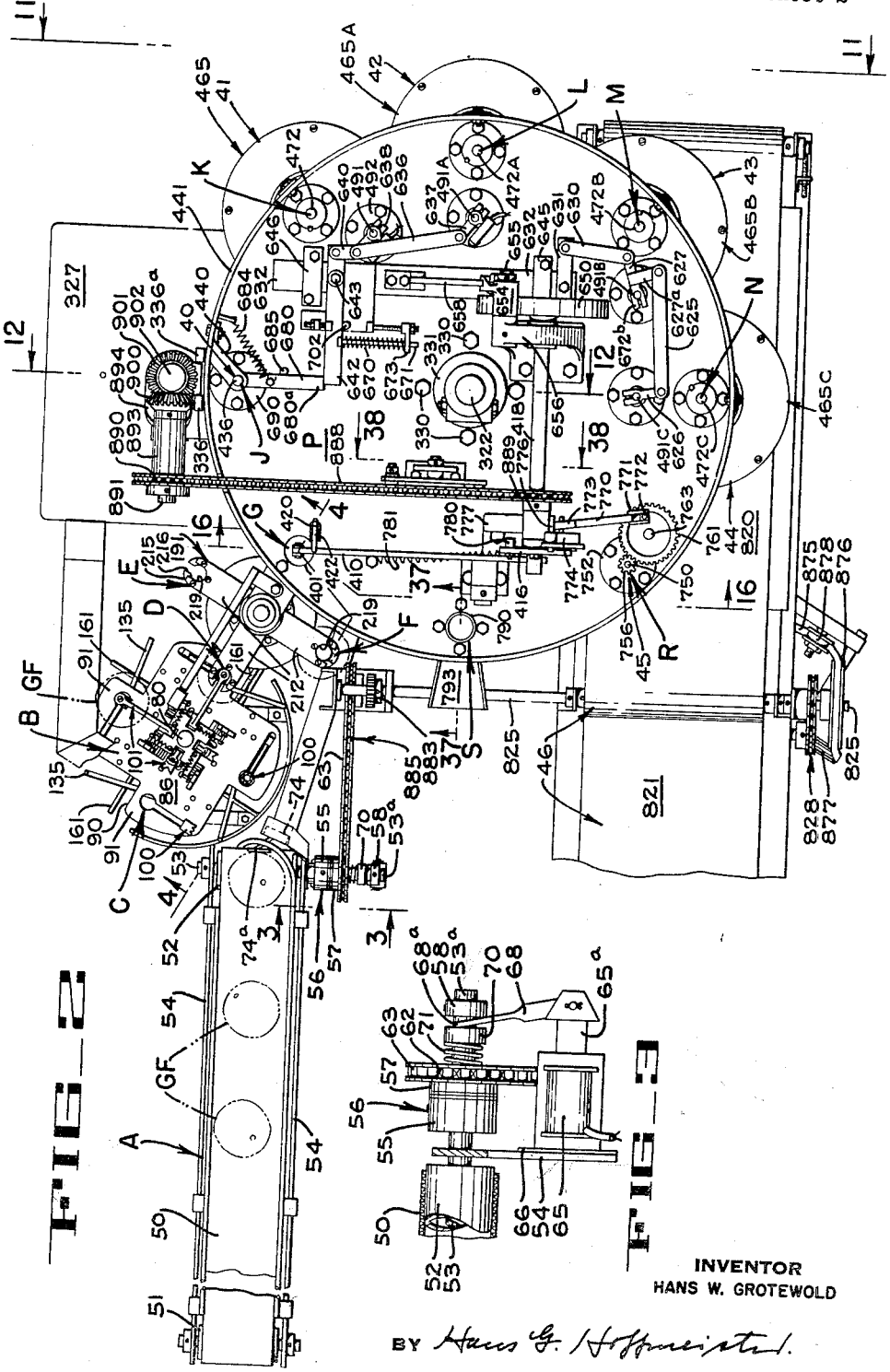

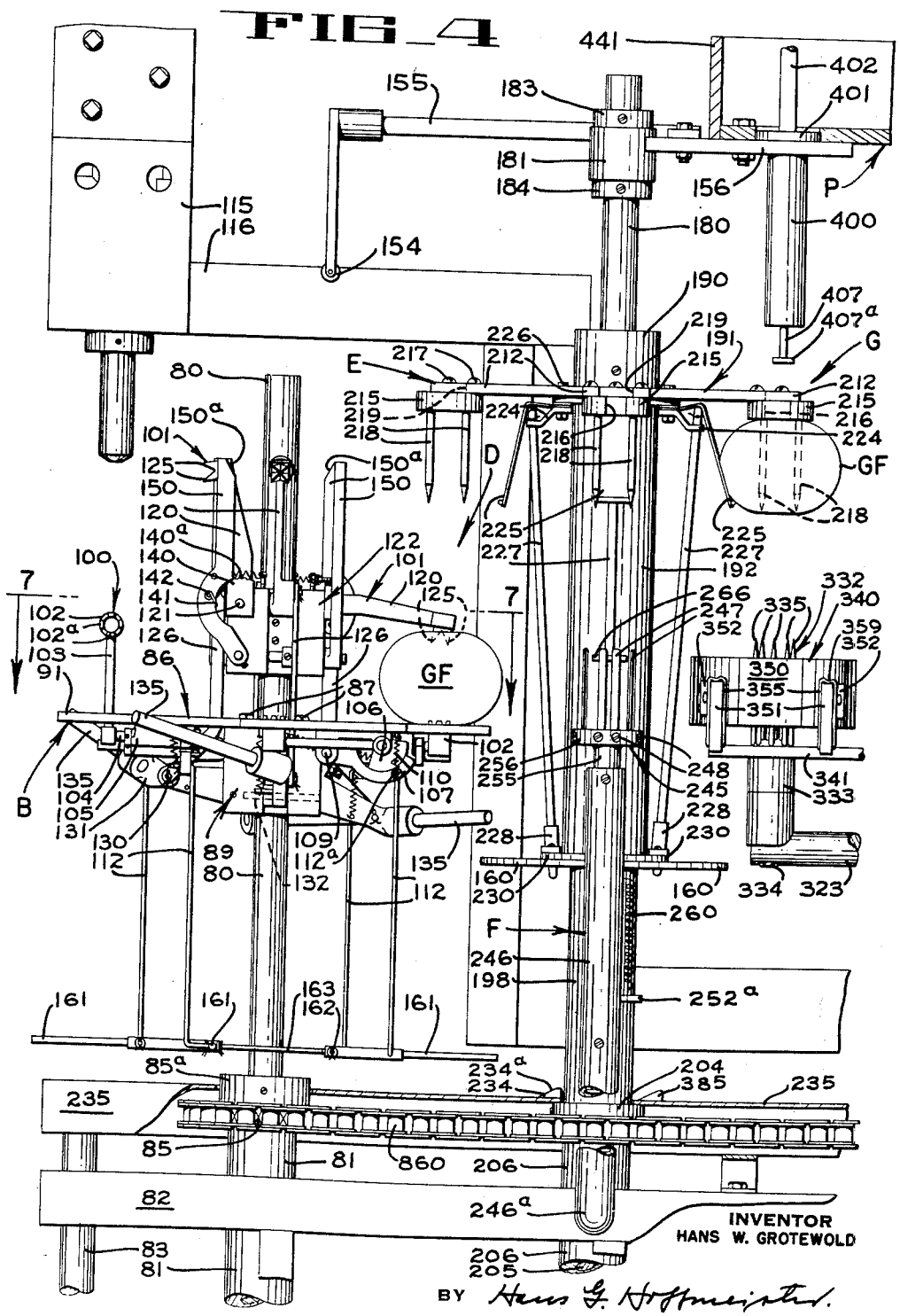

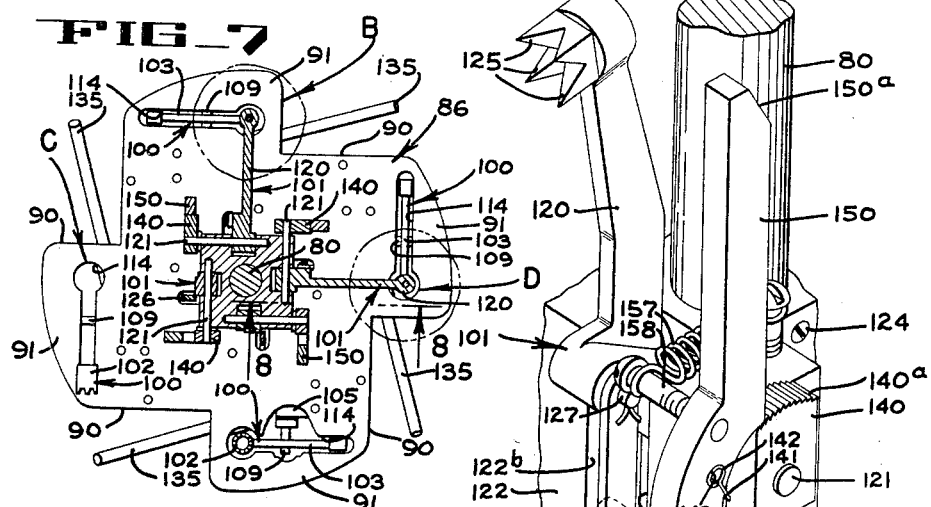

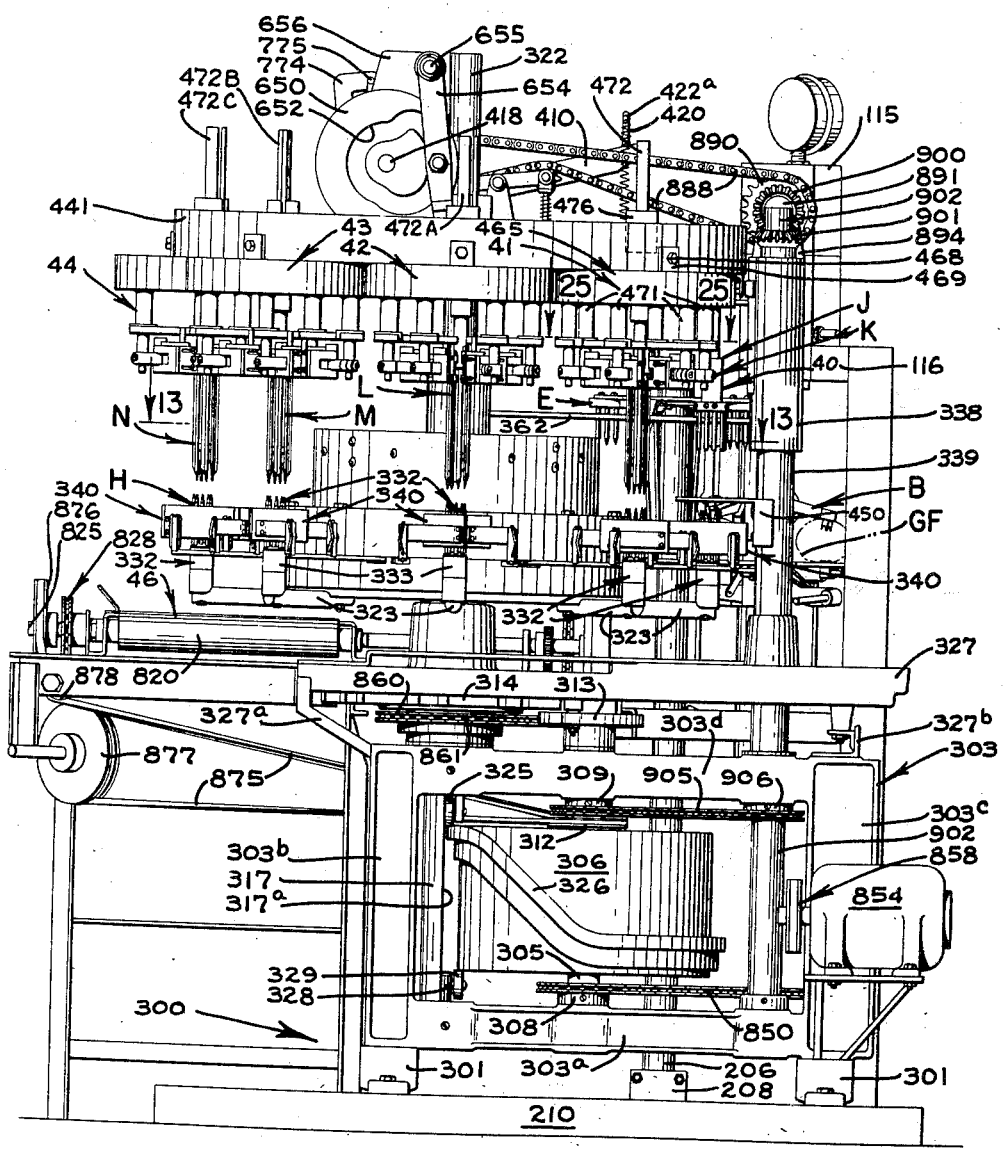

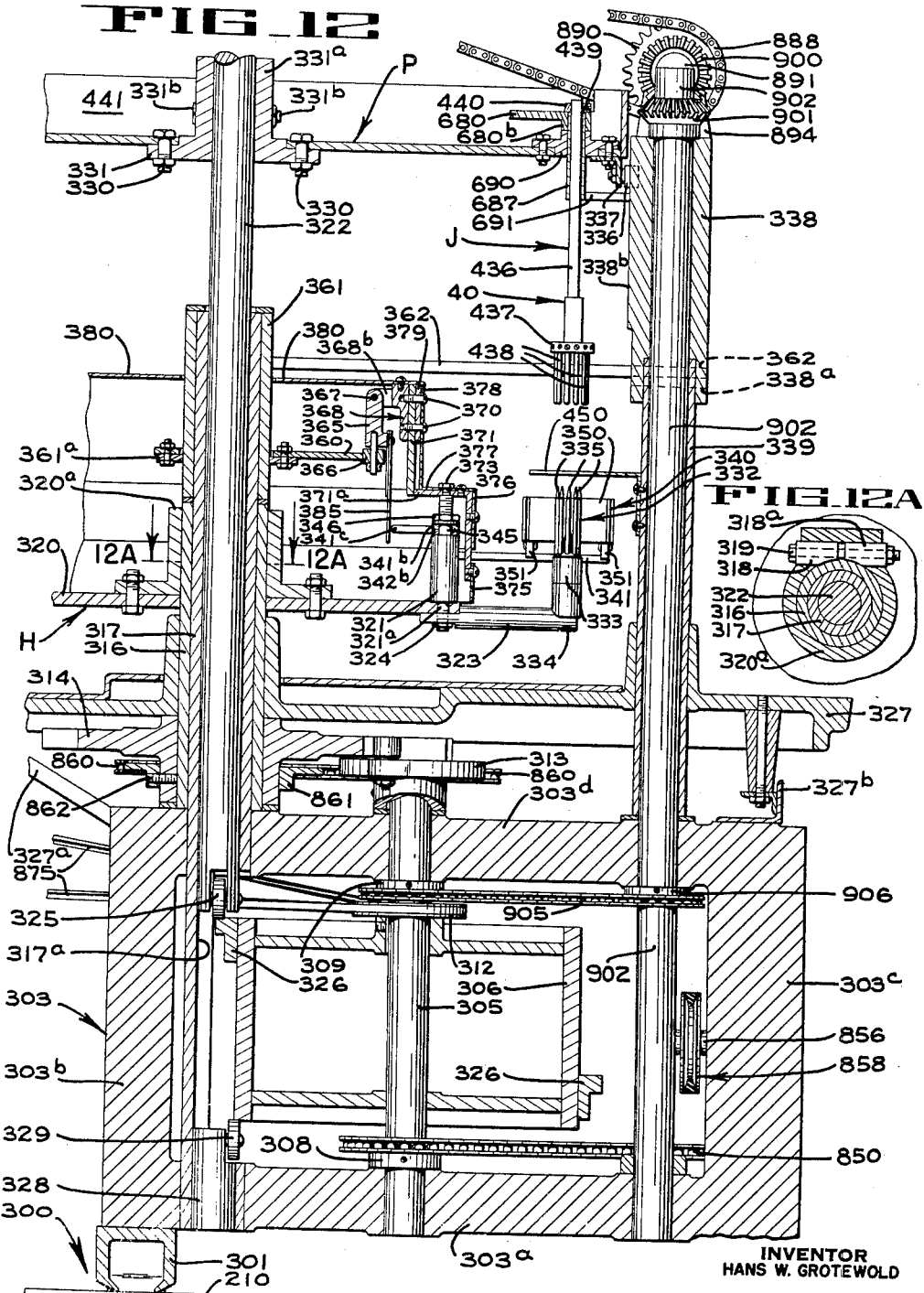

Jan. 8, 1963    H. W. GROTEWOLD    3,072,160
CITRUS FRUIT SEED LOOSENER AND SECTIONIZER
Filed April 23, 1958    17 Sheets-Sheet 8
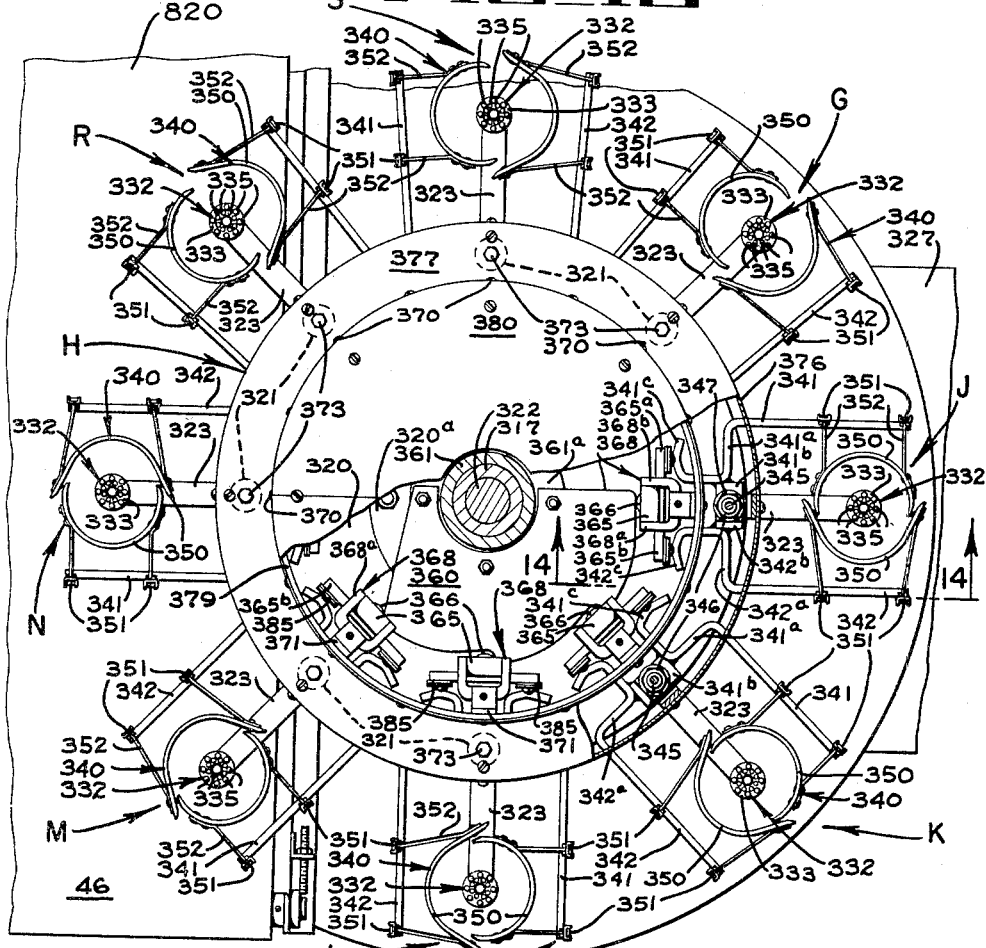
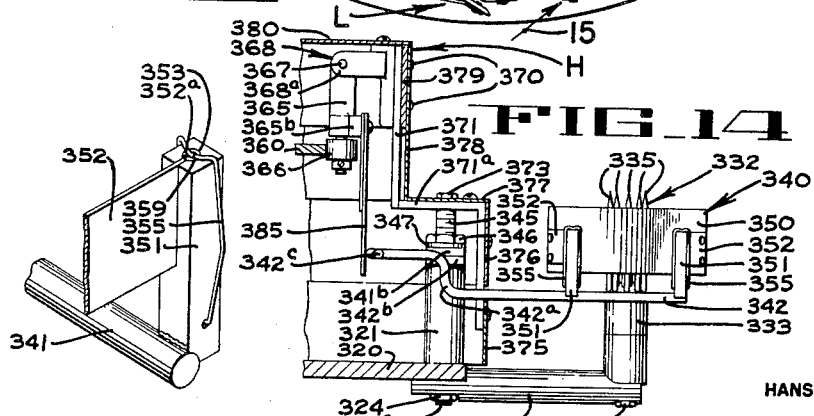
INVENTOR
HANS W. GROTEWOLD
BY Hans G. Hoffmeister
ATTORNEY

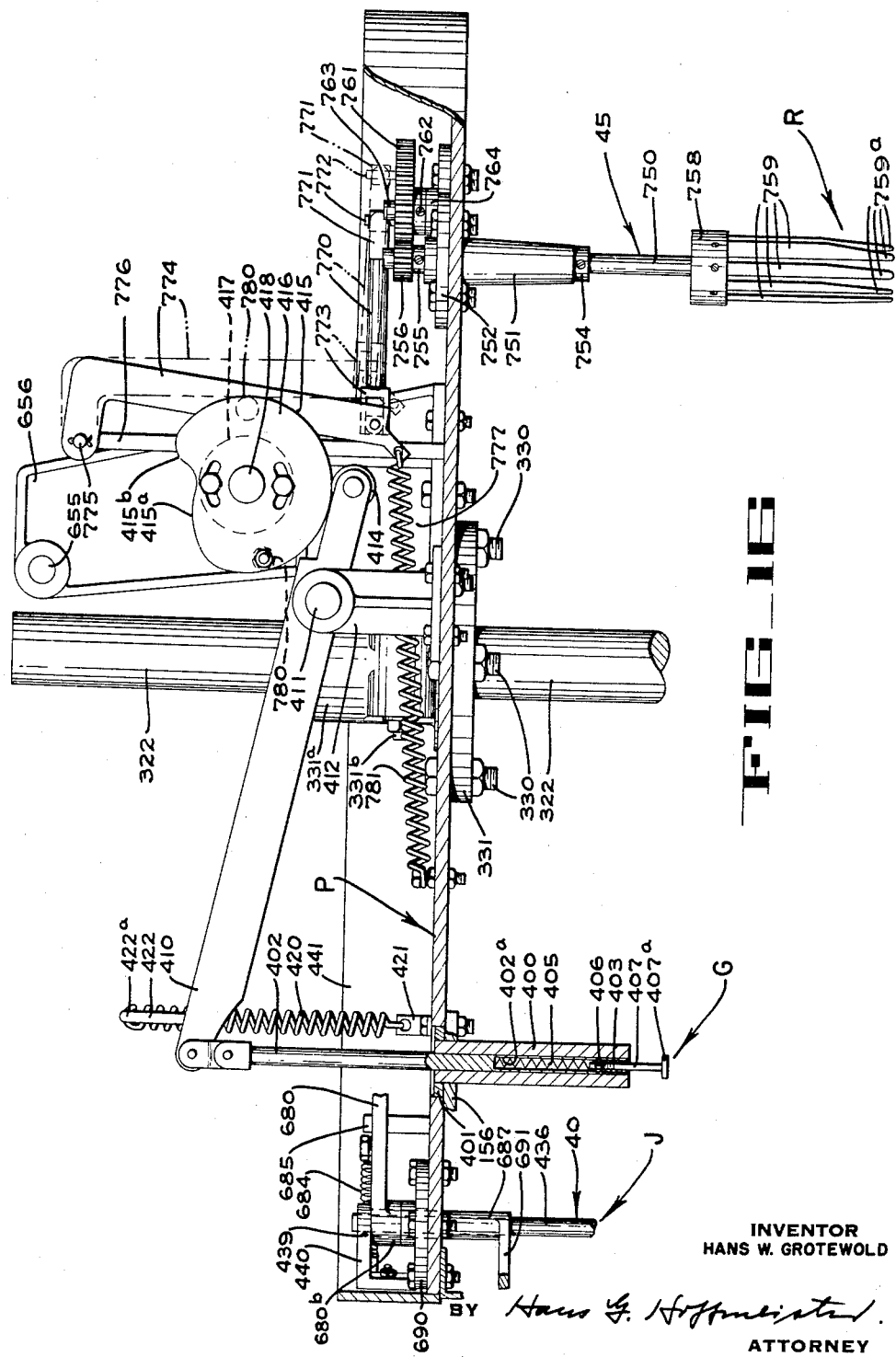

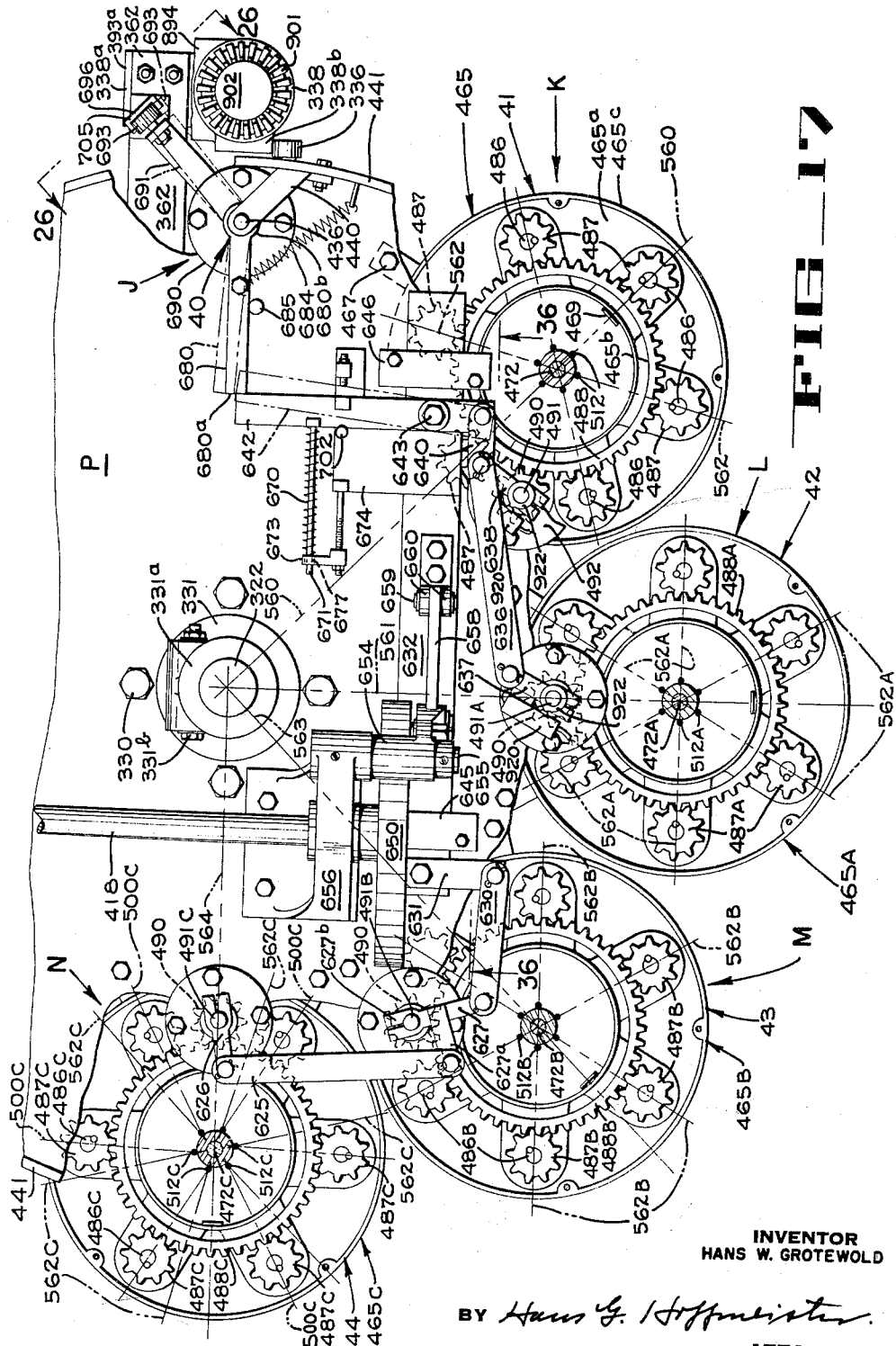

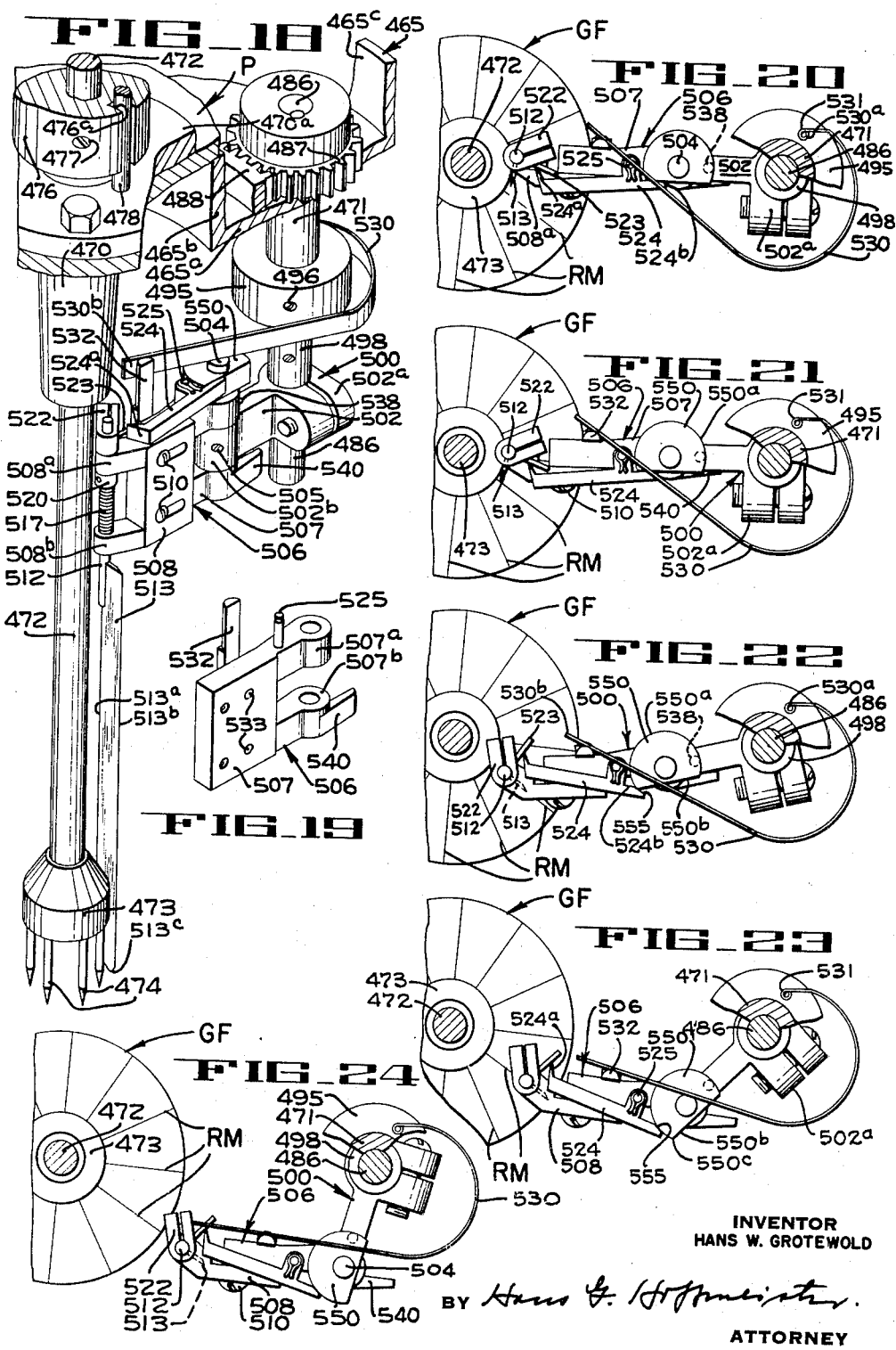

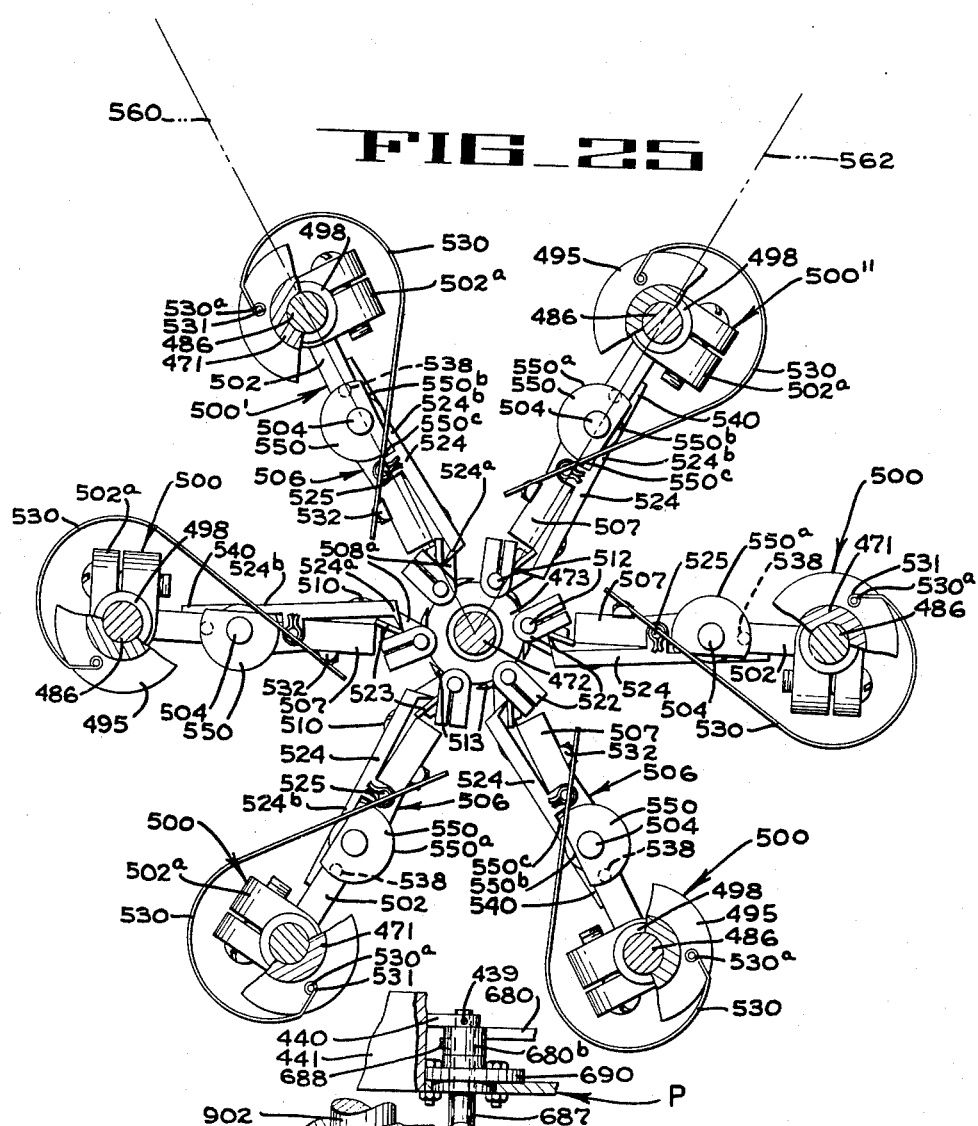

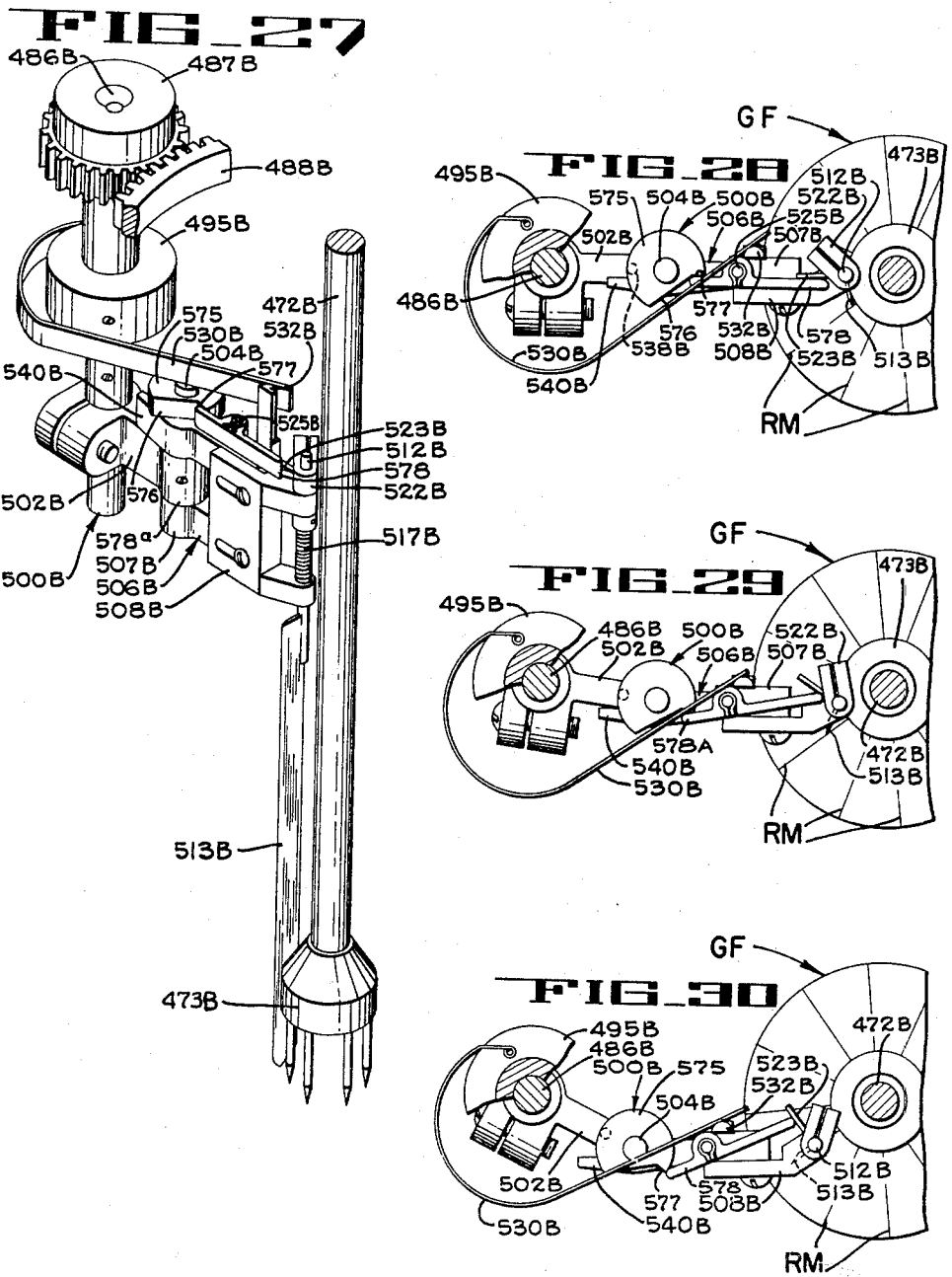

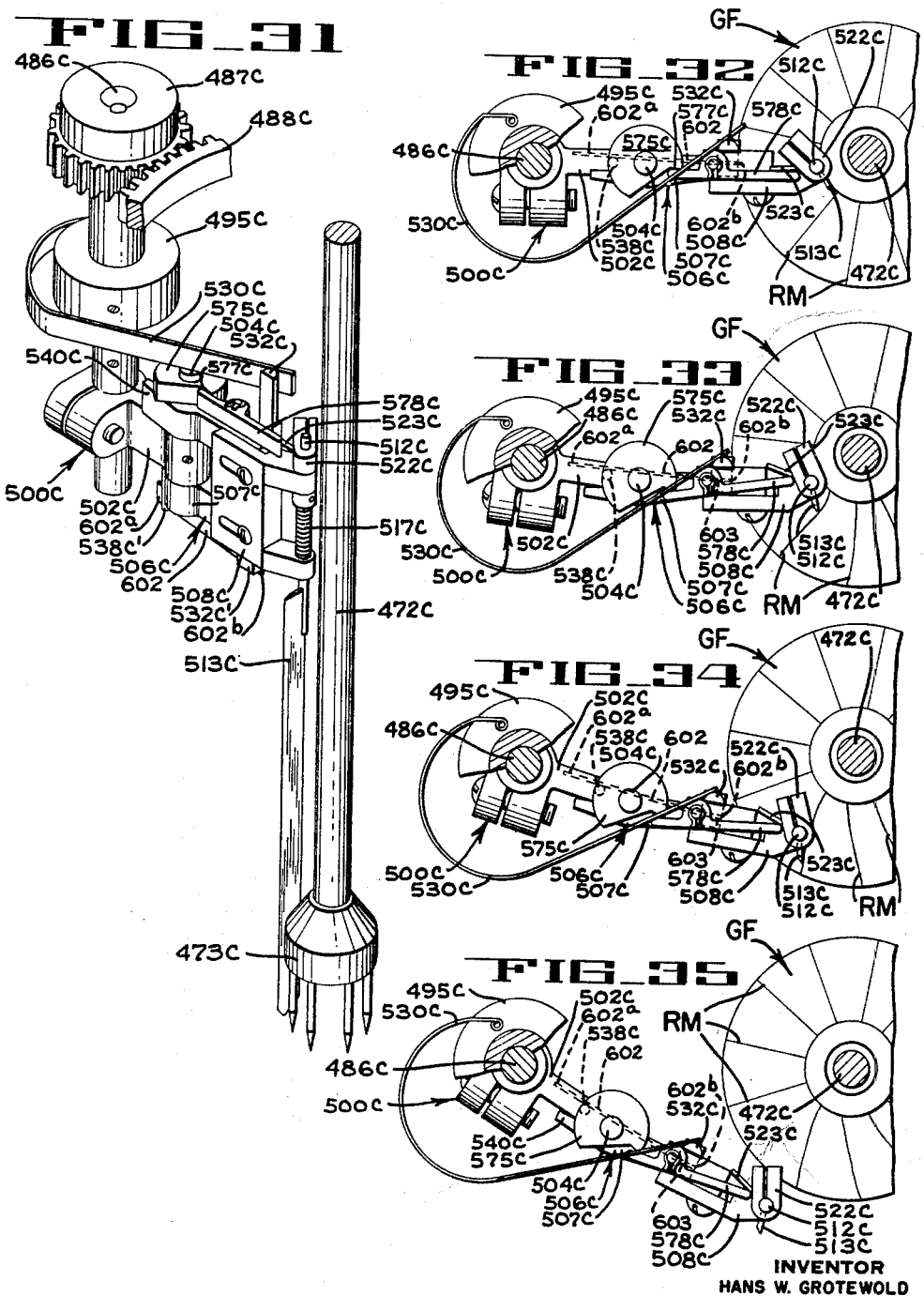

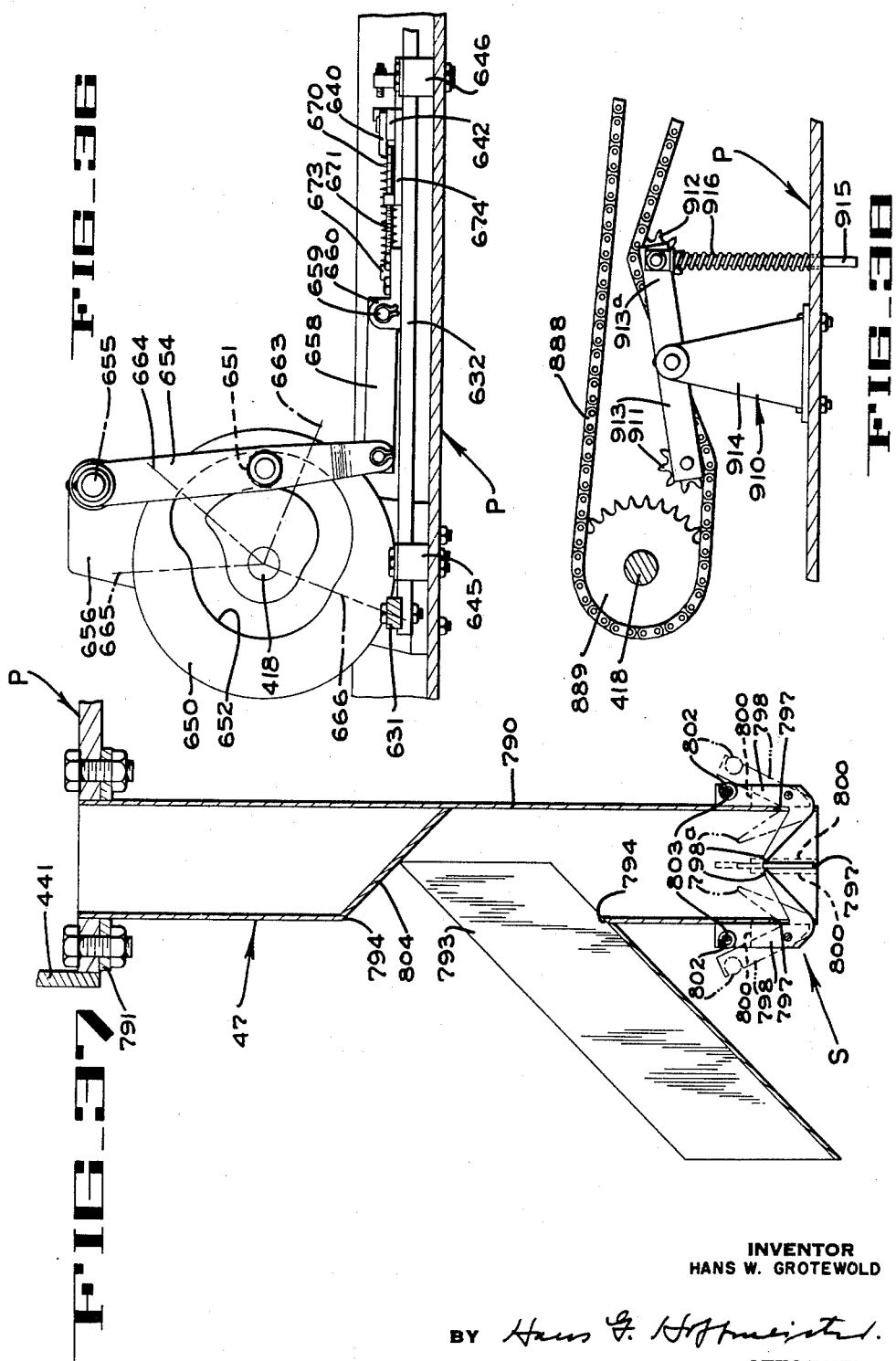

Jan. 8, 1963 H. W. GROTEWOLD 3,072,160
CITRUS FRUIT SEED LOOSENER AND SECTIONIZER
Filed April 23, 1958 17 Sheets-Sheet 16
FIG_39
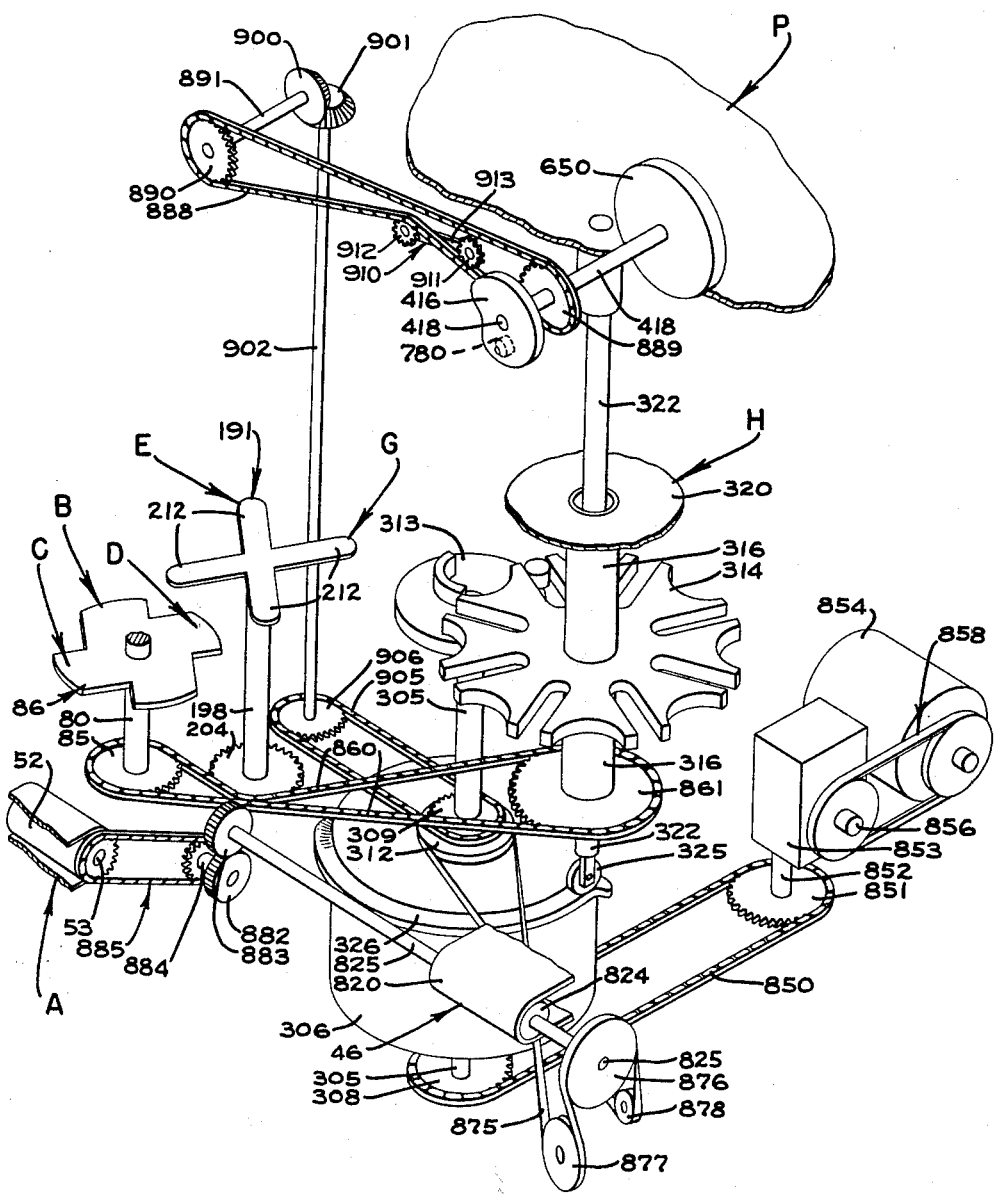
INVENTOR
HANS W. GROTEWOLD
BY Hans G. Hoffmeister
ATTORNEY

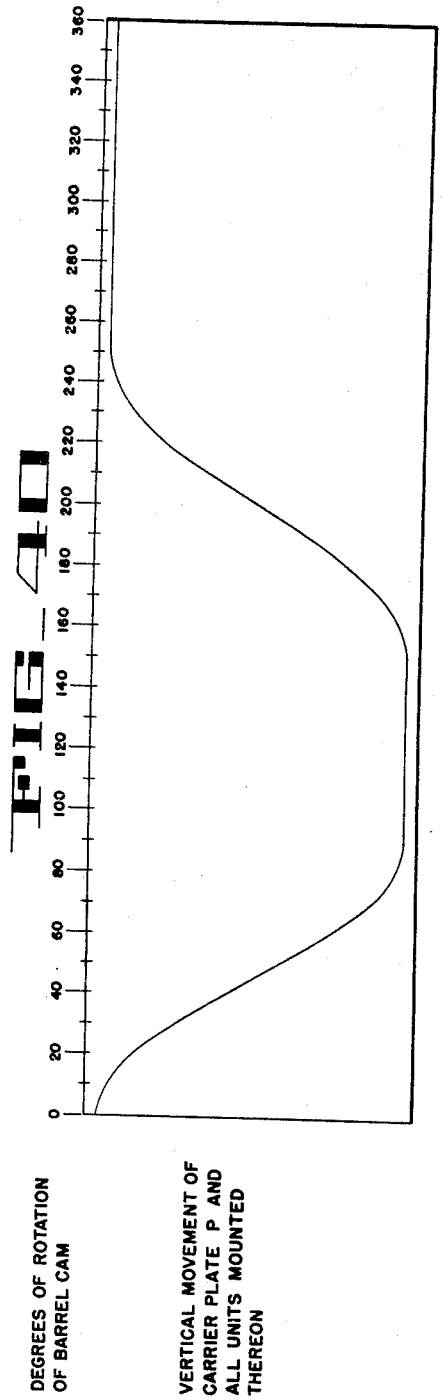

United States Patent Office 3,072,160
Patented Jan. 8, 1963

3,072,160
CITRUS FRUIT SEED LOOSENER AND SECTIONIZER
Hans W. Grotewold, Sebring, Fla., assignor to FMC Corporation, a corporation of Delaware
Filed Apr. 23, 1958, Ser. No. 730,335
17 Claims. (Cl. 146—3)

This invention pertains to the processing of fruit and more particularly relates to an apparatus for sectionizing citrus fruit, such as grapefruit.

The meat or juice-bearing portion of citrus fruit is composed of groups of interconnected juice sacs, each group being in the form of a segmental section which is surrounded by a membrane. The portions of the segment wall, which extend more or less radially from the pithy core of the whole fruit and define the plane faces of the segment, are referred to as radial membranes, while the portion of the segment wall which lies adjacent the peel of the fruit and defines the spherical face of the segment is called the outer membrane.

In the citrus fruit industry, "sectionizing" is an operation by which the naturally-shaped, membrane-free meat segments are removed from citrus fruit, particularly grapefruit, and this operation is generally performed by first peeling off the outer skin and albedo, subjecting the fruit to a hot lye treatment to remove the outer membrance from the segments, and stripping individually the segmental juice sac groups from their radial membranes. The stripping operation is usually carried out manually by inserting a blade between the meat segment and each radial membrane and cutting the meat segment loose. Such manual sectionizing is inefficient since the speed at which the operators must work makes it impossible for them to handle small irregular meat segments or to carefully cut loose even the larger meat segments.

Machines previously proposed for sectionizing grapefruit have met with limited success due to the fact that the segments in grapefruits vary in number between nine and sixteen in the average fruit and usually are of unequal size and shape. In addition, the radial membranes seldom extend in true radial directions or in flat planes. These and other variable characteristics of the fruit make it difficult to use a sectionizing machine to obtain well-formed, membrane-free meat segments in their natural size without excessive rupturing of the juice sacs of the meat.

The present invention provides an apparatus which is particularly adapted to efficiently sectionize grapefruit. In accordance with the teaching of the present invention, a first set of flat blades is moved down into a grapefruit at points encircling the central core of the fruit, each blade being inserted between two adjacent radial membranes of the fruit at the apex V-shaped meat segment enclosed by the membranes. When the blades have penetrated a short distance into the grapefruit, each blade is positively moved laterally toward one of the membranes to contact or "find" the membrane. Then the downward movement of the blades axially of the grapefruit is resumed and, when the blades have penetrated through the grapefruit, each blade is positively turned to a position generally parallel to the radial membrane and is moved toward the periphery of the grapefruit while it is resiliently pressed against the membrane. The lateral movement of each blade, to seek out and contact a membrane before the blade is moved toward the periphery, prevents the cutting of the meat segments at any point other than adjacent a membrane. Also, the positive turning of each blade after the membrane has been contacted prevents rupturing of the membrane which will occur if the membrane itself must deflect the blade to a radial position. When one set of blades has separated the meat segments from one of radial membranes, additional sets of blades are moved down into the grapefruit at preselected positions so that additional membranes are contacted and separated from the meat segments. As a result of the efficient action of the several blades, the grapefruit is sectionized in a manner that produces well-formed meat segments which are of substantially natural size and contain a minimum of ruptured juice sacs.

An object of the present invention is to provide an improved fruit processing machine.

Another object is to provide an improved machine for sectionizing citrus fruit, such as grapefruit.

Another object is to provide an improved feed mechanism for a fruit processing machine.

Another object is to provide an efficient fruit feed mechanism.

Another object is to provide an improved fruit transfer mechanism.

Another object is to provide a seed loosening mechanism for a fruit processing machine.

Another object is to provide an improved turret construction for a fruit processing machine.

Another object is to provide an efficient citrus fruit sectionizing mechanism.

Another object is to provide an improved blade holder and blade actuating mechanism for a fruit sectionizing mechanism.

Another object is to provide a fruit holder for a fruit processing machine.

Another object is to provide a mechanism for removing from a fruit processing machine the core of a fruit from which the meat segments have been stripped.

Another object is to provide an improved drive mechanism for a fruit processing machine.

Other and further objects and advantages of the present invention will become apparent from the following description taken in connection with the accompanying drawings, in which:

FIG. 1 is a perspective of the grapefruit sectionizing machine of the present invention, with parts broken away.

FIG. 2 is an enlarged plan view of the machine of FIG. 1.

FIG. 3 is an enlarged vertical section taken along line 3—3 of FIG. 2.

FIG. 4 is an enlarged fragmentary elevation of a portion of the machine of FIG. 2, taken looking in the direction of lines 4—4 of FIG. 2.

FIG. 5 is an enlarged fragmentary perspective of a portion of the feed turret shown in FIG. 4 with parts broken away and parts shown in section.

FIG. 6 is a reduced fragmentary vertical section taken along line 6—6 of FIG. 5.

FIG. 7 is a horizontal section taken along line 7—7 of FIG. 4.

FIG. 8 is a fragmentary vertical section taken along line 8—8 of FIG. 7.

FIG. 9 is an enlarged elevation of a portion of the transfer turret of FIG. 4 with parts broken away and parts shown in section.

FIG. 10 is a horizontal section taken along line 10—10 of FIG. 9.

FIG. 11 is an elevation taken looking in the direction of arrows 11—11 of FIG. 2.

FIG. 12 is an enlarged fragmentary vertical section taken along line 12—12 of FIG. 2.

FIG. 12A is a horizontal section taken on line 12A—12A of FIG. 12.

FIG. 13 is an enlarged fragmentary horizontal section taken along line 13—13 of FIG. 11 with parts broken away.

FIG. 14 is an enlarged vertical section taken along line 14—14 of FIG. 13.

FIG. 15 is an enlarged perspective taken looking in the direction of arrow 15 of FIG. 13.

FIG. 16 is an enlarged fragmentary vertical section taken along line 16—16 of FIG. 2.

FIG. 17 is an enlarged fragmentary plan of a portion of the machine of FIG. 1 with parts broken away.

FIG. 18 is an enlarged fragmentary perspective of a portion of the first sectionizing head of the present machine, showing the mounting of one blade holder of the head.

FIG. 19 is a perspective of one of the elements of the blade holder of FIG. 18.

FIG. 20 is a more or less schematic plan view of one blade holder mechanism of one head shown in operative relation with a grapefruit which is also shown schematically.

FIGS. 21–24, inclusive, are views similar to FIG. 20 but showing consecutive operating positions of the blade holder of FIG. 20.

FIG. 25 is an enlarged horizontal section of the first sectionizing head of the machine, taken along line 25—25 of FIG. 11.

FIG. 26 is an enlarged fragmentary elevation of a portion of the machine taken looking in the direction of arrows 26—26 of FIG. 17.

FIG. 27 is an enlarged fragmentary perspective of a portion of the third sectionizing head of the present machine particularly showing the mounting of the blade mechanism.

FIG. 28 is a more or less diagrammatic plan view of the blade holder of FIG. 27 shown in operative position with a grapefruit.

FIGS. 29 and 30 are views similar to FIG. 28 showing successive operating positions of the blade holder of FIG. 28.

FIG. 31 is an enlarged fragmentary perspective of a blade holder of the fourth sectionizing head of the machine of the present invention.

FIG. 32 is a more or less diagrammatic plan view of the blade holder of FIG. 31 shown in operative relation with a grapefruit.

FIGS. 33, 34 and 35 are views similar to FIG. 32 showing successive operating positions of the blade holder of FIG. 32.

FIG. 36 is an enlarged fragmentary section taken along line 36—36 of FIG. 17.

FIG. 37 is an enlarged fragmentary vertical section taken along line 37—37 of FIG. 2.

FIG. 38 is an enlarged fragmentary vertical section taken along line 38—38 of FIG. 2.

FIG. 39 is a diagrammatic perspective of the drive mechanism of the machine of FIG. 1.

FIG. 40 is a chart showing the timing of the mechanisms on the main turret of the machine of FIG. 1.

*General Operation*

In the grapefruit sectionizer of the present invention peeled and treated grapefruits are advanced on a supply conveyor A (FIGURES 1 and 2) to a position within reach of an operator, who stands in front of a feed turret B and places each grapefruit on the feed turret at station C of the turret. The feed turret B is intermittently indexed through 90° angular increments in a clockwise direction (FIG. 2) to bring each grapefruit to a transfer station D where the grapefruit is automatically transferred from the feed turret B to a transfer turret E which is also arranged to be intermittently indexed in 90° increments in synchronism with the movements of feed turret B, but in a counterclockwise direction. The grapefruit is then moved to a seed disturbing station F and then to a second transfer station G where it is deposited in one of a plurality of fruit carriers mounted on a main turret H (FIG. 1). The main turret H is arranged to be intermittently indexed through 45° angular increments in a clockwise direction to move the grapefruit successively into operative association with a second seed disturber unit 40 (FIG. 2) and with first, second, third and fourth heads 41, 42, 43, and 44, respectively, which are carried by and project downwardly from a vertically movable tool carrier or top plate P. Each head has a plurality of blades arranged to be moved down into a grapefruit to separate pie-shaped meat segments from the grapefruit core and the radial membranes. The sectionized grapefruit with the separated segments disposed around the core is then brought under a spinner or stripper unit 45 that wraps the radial membranes around the stationary core, causing any remaining bond between the membranes and the segments to be completely broken and causing the segments to drop onto a discharge conveyor 46. The core is then moved to a position under a core stripping mechanism 47 which removes the core from the fruit carrier.

*Supply conveyor*

The supply conveyor A comprises an endless belt 50 (FIG. 2) disposed around an idler pulley 51 and a drive pulley 52 which is keyed to a shaft 53 suitably journalled in a support structure 54. The shaft 53 carries one element 55 of a two piece friction clutch 56, the other element 57 being slidably journalled on an extension 53a (FIG. 3) of the shaft, said extension having a collar 58 secured to its outer end. The slidable clutch element 57 has a friction face arranged to engage a similar face on the element 55. A power driven, continuously rotating sprocket 62 is formed on the clutch element 57 so that, when the two clutch elements are brought into driving engagement, the shaft 53 will be rotated to advance grapefruit on the endless belt 50 toward the delivery end of the belt. A chain 63 (FIG. 2) which is driven in a manner to be described hereinafter, is trained around sprocket 62.

The slidable clutch element 57 is moved into and out of frictional driving engagement with the element 55 by means of a solenoid 65 (FIG. 3) which is mounted on a bracket 66 secured to the conveyor support structure 54. The solenoid 65 has an actuator arm 68 provided with a forked end 68a disposed around shaft extension 53a between the collar 58 and a slidable collar 70. When the solenoid is deenergized, the solenoid plunger 65a is spring urged to the position of FIG. 3 and the upper end of the arm 68 is moved toward the left (FIG. 3) causing the slidable collar 70 to exert a force on the slidable clutch member 57 through a coil spring 71 to move the clutch elements into engagement. When the solenoid is energized, the upper end of the actuator arm 68 is moved toward the right, relieving the pressure on the slidable clutch member 57 and permitting the friction faces of the clutch members to move relative to each other.

The solenoid is connected in an electric circuit with the normally open contacts of a switch 74 (FIG. 2) which has an actuator arm 74a adapted to be engaged by a grapefruit as it arrives at the delivery end of the belt 50. The arrangement is such that the arriving grapefruit hits actuator arm 74a and closes the contacts of switch 74 to energize the circuit and deactivate the clutch and the endless belt. The endless belt will remain deactivated until the operator lifts the grapefruit away from the switch actuator arm 74a, whereby the switch contacts are automatically returned to their normally open position, deenergizing the solenoid to activate the clutch and the endless belt so that another grapefruit will be advanced to the delivery end of the belt.

*Feed Turret*

The feed turret B comprises a vertical shaft 80 (FIG. 4) mounted for rotation in an elongated tubular bearing 81 which is secured to and projects through a horizontal channel 82. The channel 82 is supported at one end by the support structure of the main turret H and at the other end on a post 83 which rests on the floor. A sprocket 85 is disposed on shaft 80 and has a hub 85a by which the sprocket is keyed to the shaft. The sprocket 85 abuts the upper end of the tubular bearing 81 and thereby prevents downward movement of the shaft 80 in the bearing. A horizontal plate 86 (FIG. 4) is mounted on the shaft 80, said plate having a central portion 86a (FIG. 5) secured by capscrews 87 to a bracket 89 that is keyed to the shaft 80 by setscrews 88 and has four equi-spaced vertical recesses 89a, each recess being defined by a rear wall 89b and two spaced side walls 89c and 89d. The support plate 86 has equally spaced peripheral cutout portions 90 (FIG. 7) which divide the radially outer portion of the plate into four support arms 91. A fruit positioning unit 100 and a fruit clamping unit 101 (FIG. 5) are mounted on each of these arms. All four positioning units 100 are identical and all four clamping units 101 are identical. Accordingly, a description of one of each of these units 100 and 101 will be sufficient to disclose the structure and operation of all of the units.

Each positioning unit 100 (FIG. 5) comprises a tubular member 102 which has projections 102a on one end and is mounted on a lever 103 that is secured to one end of a shaft 104. The shaft which is journalled for rotation in a plate 105 secured to the undersurface of the support plate 86, as seen in FIG. 6, carries a brake block 106 which has a lower surface adapted to engage a similar surface on a brake lever 107. A spring 108, that is connected between the plate 86 and the brake block 106, urges the block in a direction tending to effect clockwise pivoting of lever 103 (FIG. 6) to raise the positioning member 102. The brake lever 107 is pivotally mounted on the plate 105 by a shaft 109 and is urged upwardly toward the brake element 106 by a spring 110, connected between a stud 111 (FIG. 5) in the support plate 86 and the upper bent end 112a of a brake release rod 112 which projects through the end of the lever 107. The lever 103 is movable from a lowered position wherein it abuts a stop member formed by an extension (FIG. 6) of shaft 109 and wherein the positioning member 102 is disposed in a key-shaped opening 114 (FIG. 5) in the plate 86 to an upwardly projecting position shown in FIG. 5, with an end surface 106a of the brake block 106 abutting a stop member provided by the undersurface of the plate 86. In both the upper and lower positions the brake block 106 engages the lever 107 and is effective to hold the lever 103 in position.

When the lever 103 is in the raised position of FIG. 5, the operator places the blossom end of a peeled grapefruit against the projections 102a and swings the member 102 downwardly to move the positioning member into the opening 114 in the plate 86 and bring the grapefruit down onto the plate 86 directly below a centering light 115 (FIG. 4). The light 115 is suitably supported from the main turret support structure by an arm 116 and so positioned that a vertical beam of light is directed downwardly toward the center of the positioning element 102 in the opening 114 in the plate. Accordingly, a spot of light is projected onto the grapefruit and, if the spot falls on the stem end of the grapefruit, the stem-blossom axis of the grapefruit is in a true vertical position.

Each clamping unit 101 comprises a clamp arm 120 (FIG. 5) pivotally mounted on a pin 121 (FIG. 7) which extends between two spaced wall members 122a and 122b of a bracket 122 that is secured to the turret shaft 80 by setscrews 124 (FIG. 5). Prongs or spurs 125 are formed on the outer end of the arm 120. A downwardly projecting link 126 is pivotally connected to clamp arm 120 by a pin 127 that is fastened on the clamp arm 120 at a point spaced from the pivot pin 121. At its lower end the link 126 is pivoted on a pin 130 projecting from a lever 131 which has an inner end portion 131a (FIG. 8) pivotally mounted on a pin 132 extending between the side walls 89c and 89d of the bracket 89. A rod-like handle 135 which is secured in the outer end of lever 131, projects upwardly into the adjacent recess 90 within convenient reach of the operator. A spring 136 is connected between the lever 131 and the plate 86 to urge the lever upwardly to bring the clamp arm 120 to the upright position of FIG. 5. In this position, an adjustable stop bolt 138 (FIG. 8) which is threaded through an ear formed on the inner end of the lever, abuts the rear wall 89b of the associated recess 89a.

When the clamp arm 120 is moved downwardly to clamp a grapefruit against the plate 86, a brake shoe 140 (FIG. 5) which is also keyed to the same shaft 121 that carries lever 120, and has a serrated surface 140a, is swung forwardly and downwardly until one of the edges provided by the serrated surface engages a knife edge 141, formed on a lever 150 by rolling one end of a flat spring element 142 and placing it in a hole 143 of the lever 150 which is pivotally mounted on a pin 151 projecting from the bracket 122. The interengagement of the knife edge 141 and the serrated surface of the brake shoe 140 locks the clamp arm in clamped relation on the grapefruit.

As seen in FIG. 4, each lever 150 has an inclined camming edge 150a at its upper end. This edge 150a is positioned for contact by a roller 154, which is mounted on an arm 155 fixed to a bracket 156 that is carried by the top plate P for vertical movement therewith. The roller 154 is arranged to contact the camming edge and swing the lever 150 about pin 151, moving the knife edge away from the serrated surface of the brake element against the action of a spring 157 (FIG. 5) which is connected between a pin 158 on the lever 150 and the bracket 122. The spring 157 holds the lever 150 in the upright position of FIG. 5 at all times except when the lever is engaged by roller 154. It will be noted in FIG. 4 that the roller 154 on the top plate P is positioned above station D where the grapefruit GF is transferred from the feed turret B to the transfer turret E. At this station D, the grapefruit to be transferred is clamped between the clamp lever 120 and the plate 86. Accordingly, when the roller 154 is moved downwardly and engages camming edge 150a to release the brake element, the spring 136 associated with the clamping lever 120 swings the lever away from the grapefruit to its upper position unclamping the grapefruit.

Similarly, the brake lever 107 associated with each grapefruit positioning member 102 is released by a circular plate 160, which is mounted on the transfer turret E, contacts a lever 161 that is pivotally mounted on a pin 162 welded to a plate 163 secured to the feed turret shaft 80. As will be explained presently, the plate 160 acts as a lifter member at station F and as a latch plate at stations D and G. The lever 161 is pivotally connected to the lower end of the brake release rod 112. When the circular plate 160 on the transfer turret moves downwardly and contacts the lever 161, it pivots lever 161 downwardly, causing the rod 112 to release the brake lever 107. The spring 108, associated with the lever 107, will then swing the positioning lever 102 to upright position. This release of the positioning lever 102 does not take place at the transfer station D but is effected following the next indexing movement that moves the lever away from station D.

Transfer Turret

The transfer turret E (FIGURES 4 and 9) comprises a vertical shaft 180 which is rotatably journalled near its upper end in a bearing 181 (FIG. 4) that is welded to the bracket 156 secured to the top plate P. Collars 183 and 184 are secured by setscrews to the shaft 180 on either side of the bearing 181 so that vertical reciprocating movement of the bearing with the top plate P causes vertical reciprocation of the shaft 180. The shaft 180 extends downwardly through a hub 190 which has a prong carrier plate 191 and a depending tubular shaft 192 (FIG. 9) welded thereto. A pin 195 extends through an opening in the lower end of shaft 180 and into the side walls of the tubular shaft 192 so that the tubular shaft 192 is secured to the turret shaft 180 for vertical reciprocating movement and rotary movement. A second tubular shaft 198 is disposed between the shaft 180 and the tubular shaft 192. This shaft 198 has a pair of diametrically opposed vertical slots 199 which receive the pin 195 and permit vertical movement of the shaft 180 relative to the second tubular shaft 198. The second tubular shaft 198 is secured by setscrews to a sprocket 204 and to a lower shaft 205 which is journalled for rotation in a vertical tubular bearing member 206 that is welded in an opening in the inverted structural channel 82. Near its lower end the bearing 206 is clamped to an angle bracket 208 (FIG. 1) that is welded to one of two base channels 210 of the machine. A collar 211 is setscrewed to the lower shaft 205 at a point adjacent the lower end of the vertical bearing 206. It will therefore be seen that, when the sprocket 204 is rotated, the shaft 198 rotates the prong carrier 191, and, when the shaft 180 is moved vertically, the prong carrier is also moved vertically.

The prong carrier 191 has four arms 212 (FIG. 2) spaced at 90° intervals around the carrier and projecting radially outwardly from the hub 190. The outer end of each arm 212 has two spaced fingers defining a generally semi-circular opening 219 (FIG. 9). A ring 215, which is secured by capscrews 217 to the underside of this outer end portion of arm 212, is provided with an opening 216 at its outermost side, and with four equally spaced, downwardly projecting prongs 218. When the tool carrier P moves downwardly the prongs 218, that are disposed above a grapefruit GF held on the feed turret B at transfer station D (FIG. 4), pierce the grapefruit. The openings in the outer end of the arm 212 and in the ring 215 are arranged to receive the outer end of the clamp arm 120, permitting the undersurface of the ring 215 to move into contact with the top surface of the grapefruit. During the last part of the downward movement of the transfer turret E, the roller 154 contacts the camming edge 150a of lever 150, swinging the lever 150 outwardly and permitting the clamp arm 120 to be swung upwardly away from the grapefruit.

A spring clamp 225 (FIG. 9) and a guide bracket 224 are secured by a capscrew 226 to the prong carrier 191 radially inwardly of each set of prongs 218. A clamp control push rod 227 is guided at its upper end in an opening 224a in the bracket 224 and, at its lower end, is provided with an elongated collar 228 which projects through an opening 229 in the plate 160 and through a slot 230a in a circular plate 230, said plates being secured in superposed relation on the lower end of the tubular shaft 192. When the turret E is near the end of the downward movement, the lower end of the push rod 227 engages a cam 234 (FIG. 4) that is secured to the upper surface of a fixed table 235 which will be described presently. The cam 234 forces the push rod upwardly, moving the upper end of the rod against the spring clamp 225, and urging the rounded lower end of the clamp 225 against the grapefruit. The cam 234 has an inclined camming surface 234a which forces the lower end of the push rod radially outwardly away from the axis of shaft 198 to position an annular shoulder 228a (FIG. 9) on the lower end of collar 228 on a ledge 236 formed around opening 229. The resiliency of the spring clamp 225 holds the shoulder 228a on the ledge. A ring 237 prevents excessive outward movement of the rod 227. Thus, the grapefruit is held in place on the prongs, and the spring clamp is locked in clamping position by the ledge 236.

When the transfer turret E is next moved upwardly, the impaled and clamped grapefruit is carried upwardly away from support plate 86. The subsequent indexing movement of the transfer turret E brings the grapefruit to station F directly above a seed-disturbing unit 245 (FIGS. 4 and 9). The unit 245 comprises a tubular support member 246 having an inturned lower end 246a welded to the support channel 82 (FIG. 9). The tubular member 246 projects vertically upwardly in parallel spaced relation to the central turret shaft 198, and is provided with a cutout portion 246b in which a block 248 is secured by setscrew 249. The block 248 has a slanted surface 248a along which the rounded lower corner 250a of a rod 250 slides. The rod 250 has an arm 250b which projects outwardly through the cutout 246b and carries a roller 251 on a pivot pin 252 at its end portion. At its upper end, the rod 250 is pivotally connected by a pin 253 to a plunger 254 which is slidably journalled in a tubular hub 255 which is secured in fixed position in the upper end of the tubular member 246. A plurality of elongated, upwardly projecting blades 247 are secured by setscrews 248 in an upper flange 256 of the hub 255. Each blade 247 is generally rectangular in transverse cross-section being approximately 1/16 inch thick and 3/16 inch wide. As seen in FIG. 10, the blades are so positioned that two blades are in vertical alignment with a space between adjacent prongs 218 of the prong unit disposed directly above the seed disturber unit. It is to be noted that the blades 247 are relatively thin and have rounded upper edges, and their function is not to engage the seeds and push them out of the grapefruit but rather to shift the seeds sidewise and loosen the seeds from their bond with the grapefruit flesh.

The push rod 250 is urged upwardly in the tubular support member 246 by a spring 260 which, at its lower end, is hooked around a projection 252a (FIG. 4) of the pivot pin 252 and, at its upper end, in an opening 262 in the support member 246. A bracket 263 (FIG. 9) is secured to the outer surface of the tubular support member 246 and carries a roller 264 which is disposed opposite the cutout portion 246b and in the path of upward movement of the roller 251. In operation, when the transfer turret E is moved downwardly, a grapefruit, clamped on the turret and disposed at station F, is carried downwardly causing the lower surface of the grapefruit to engage and be penetrated by the seed disturbing blades 247. When the blades are a short distance in the grapefruit, the grapefruit engages a plate 266 on the upper end of the plunger 254, causing the plunger to be moved downwardly as the blades penetrate further into the grapefruit to engage and loosen the seeds disposed around the core of the grapefruit. As the plunger is moved downwardly, the lower end of the pivotal push rod 250 is cammed outwardly to a position wherein the roller 251 overlies the circular plate 160 of the transfer turret as shown in phantom lines in FIG. 9. When the transfer turret is subsequently raised, the circular plate 160 pushes upwardly on the roller 251 which, through the push rod 250 and the plunger 254, transmits this upward push to the lower end of the grapefruit whereby the hold of the seed disturber unit, on the grapefruit, due to friction and suction forces, is positively broken and the grapefruit is carried upwardly on the prongs 218. When the transfer turret E is next indexed, the grapefruit is moved to the second transfer station G where the grapefruit is transferred to the main turret H.

*Main Turret*

Referring to FIGURES 1 and 11, it will be seen that the main turret H is mounted on a base 300 comprising the two spaced base channels 210, two spaced bars 301 which extend between the channels 210 and are bolted thereto, and a vertical frame 303 which is fixed to the bars 301 and projects upwardly therefrom. The frame 303 (FIG. 11) comprises a bottom member 303a, two side members 303b and 303c and a top member 303d. A vertical shaft 305, on which a barrel cam 306 is keyed is journalled for rotation in the bottom and top members 303a and 303d. A drive sprocket 308 is keyed to shaft 305 between the lower end of the barrel cam and the bottom member 303a and a driven sprocket 309 is secured to the shaft 305 between the top of the barrel cam and the top members 303d of the support frame 303. A pulley 312 and a driver 313 of a Geneva drive mechanism are also secured to the shaft 305. The Geneva driver 313 is arranged to periodically engage and rotate a Geneva gear 314 that is keyed to a tubular shaft 316

(FIG. 12) which is rotatably journalled around a guide shaft or tube 317. Near its lower end, the second shaft 317 is fixed, as by setscrews, in both the bottom frame member 303a and the top frame member 303d. A turret plate 320 is provided with a hub 320a clamped around the tubular shaft 316 for rotation therewith by means of two gripper blocks 318 and 318a (FIG. 12A) which are slidable in a transverse opening in the hub 320a and are arranged to be forced into gripping engagement with the shaft 316 by a bolt 319. A vertically reciprocable shaft 322, which is slidable in the tubular shaft 317, carries at its lower end a roller 325 which rides along the upper surface of a cam track 326 formed on the periphery of the barrel cam 306. The lower end of the vertical shaft 322 is also slidably journalled on the inner wall of the fixed guide tube 317 which has a cut-away portion 317a into which the cam track 326 projects. A block 328 is secured in the lower portion of tube 317 and carries a roller 329 which is disposed in supporting contact with the lower surface of barrel cam 306. A table 327 is disposed immediately below the turret plate 320, being supported at opposite marginal edges by brackets 327a and 327b secured to the base frame member 303d.

The before-mentioned tool carrier or top plate P is secured by bolts 330 to a circular flange 331 that has a hub 331a clamped to the vertically movable shaft 322 by a bolt 331b which actuates gripper blocks identical to the blocks 318 and 318a of FIG. 12A. Therefore, when the shaft 322 is reciprocated in a vertical direction, as the roller 325 rides along cam track 326, the top plate P is also reciprocated vertically. The top plate is guided during its vertical reciprocating movement by two spaced rollers 336 and 336a (FIGS. 2 and 12) which are mounted on a bracket 337 secured to the top plate. The rollers ride along oppositely facing vertical, flat wall portions formed on an extended portion 338b of a tubular bearing member 338 that is supported from the base frame 303 by a tubular support member 339.

The turret plate 320 (FIGS. 13 and 14) has eight upstanding posts 321 mounted in equally spaced relation around its outer periphery. Directly below each post 321 a support arm 323 extends radially outwardly from the under surface of the plate 320. Each post 321 and its associated support arm 323 are held in fixed position by a nut 324 (FIG. 14) that is threaded on a stud 321a projecting downwardly from the post through suitable openings in the plate and in the support arm. A fruit carrier unit 332 is mounted on the outer end of each support arm, said unit comprising an upstanding prong holder 333 which is secured by a capscrew 334 to the outer end of the arm 323. Two concentric circles of prongs 335 (FIG. 13) are fixed in and project upwardly from the prong holder 333.

A fruit clamping mechanism 340 is associated with each fruit carrier 332. Each clamping device comprises two arms 341 and 342 (FIG. 13) which are disposed on opposite sides of the prongs 335. The arm 341 has a radially inner offset portion 341a carrying an apertured tab 341b that is rotatably journalled on a threaded reduced diameter projection 345 (FIG. 14) of the associated upstanding post 321. Similarly the arm 342 has an offset portion 342a carrying an apertured tab 342b rotatably disposed around the reduced diameter projection 345. A nut 346 is threaded on the projection 345 and is arranged to press a washer 347 against the superposed tabs 341b and 342b. The arms 341 and 342 have inner end portions 341c and 342c, respectively (FIG. 13) that are bent to a position generally normal to a line extending radially from the axis of hub 320a.

A generally semi-cylindrical band 350 is mounted on the two spaced posts 351 that project upwardly from the outer end portion of each of the arms 341 and 342. Each band 350 is made of yieldable material, such as rubber, and has a spring steel strap 352 riveted to each end. Each of the straps 352 (FIG. 15) has a curled inner end 352a which is slipped into a keyhole slot 353 extending downwardly in the associated post 351. A spring clip 355 is pivotally mounted at its lower end in each post 351 and has a pointed intermediate portion 359 arranged to extend into the top portion of the keyhole slot to resiliently retain the spring clip 355 in place.

The clamp arms 341 and 342 are urged toward each other to grip a fruit on the prong carrier by means of a cam plate 360 (FIGS. 12 and 13) which is secured to a flange 361a which is welded on a tube 361. The tube 361 is disposed around the fixed shaft 317 and is held against rotation by a flat bar 362 that is secured to a flange 338a of the tubular bearing member 338. The cam plate 360 is arranged to engage a follower roller 366 (FIG. 14) carried on the lower end of a lever 365. At its upper end the lever 365 is pivotally mounted on a pin 367 between two arms 368a and 368b (FIG. 13) of a bracket 368 that is secured by capscrews 370 (FIG. 14) to the upper end of a fixed mounting member 371. The mounting member 371 is held in fixed position by means of a capscrew 373 which passes through an opening in a horizontal portion 371a of the member 371 and is threaded in the upper end of the reduced diameter projection 345 of post 321. It will be evident that, since there are eight posts 321 there will be eight fixed mounting members 371 spaced around the periphery of the turret. These eight mounting members provide support for annular dust shields 375, 376, 377, 378, a rigid band 379, and a cover plate 380, all of said members being connected to the fixed mounting members by capscrews or the like.

The cam-actuated lever 365 has two laterally projecting arms 365a and 365b (FIG. 13) adjacent its lower end. Each of these arms carries a downwardly projecting leaf spring 385 which is disposed opposite one of the bent inner arms 341c or 342c of the clamp arms 341 and 342. As seen in FIG. 13, each follower roller 366 comes into contact with the outer peripheral camming edge of the cam plate 360 just after the associated fruit carrier 332 has completed its movement from transfer station G to the second seed disturber station, indicated by reference letter J. The camming surface is so designed that the fruit clamping members 340 are moved toward a position around the grapefruit in the fruit carrier but are not urged into gripping engagement with the grapefruit at this seed disturber station. However, when the next indexing movement of the turret begins the cam immediately pivots lever 365 causing the clamping bands to grip the grapefruit. When the fruit reaches station K under the first head 41, the roller follower 366 moves into a recess in the camming surface, causing the clamping bands to relax their grip on the grapefruit while the first head cuts into the grapefruit. When the fruit carrier is moved to station L under the second head 42, the bands are moved to gripping engagement with the grapefruit and then relaxed when station L is reached. Similarly, the bands are tightened around the grapefruit during movement from station L to M, and released at station M under the third head 43. Since the clamping bands are relaxed during the operation of the heads, they will yield and move outwardly when contacted by the blades of the sectionizing heads as the blades move radially outwardly through the grapefruit. The light clamping pressure on the grapefruit as it is moved from station to station keeps the grapefruit in a compact form and in a predetermined orientation and prevents shifting of the grapefruit sections. As will be explained presently, at station M under the third sectionizing head the blades of the head are not moved all the way out through the grapefruit. Accordingly, the bands will not be spread by the blades and, no inward movement of the bands is necessary between station M and N. At station N the blades move the bands to an outer spread position. Since there is no further need for keeping the grapefruit in compact form, the clamping bands are not moved inwardly again until the seed disturber station J is again reached by the fruit carrier.

Referring again to FIG. 4, it will be seen that when a grapefruit is carried to transfer station G by the transfer turret, the grapefruit is held in clamped position directly above a fruit carrier 332 of the main turret H. When the top plate P is moved downwardly, the grapefruit, which is still impaled on prongs 218, is then impaled on the prongs 335 of the carrier 332 also. The prongs 218 are so spaced that they assume a position radially outwardly of the circular rows of prongs 335. Just before the end of the downward movement of the transfer turret, the lower end of clamp control push rod 227 engages a cam 385 which is arranged to cam the push rod radially inwardly to slide the annular shoulder 228a of collar 228 off the ledge on which it is disposed, thereby releasing the spring clamp 225 from clamping engagement with the grapefruit.

A grapefruit hold down mechanism is mounted on the top plate P at station G for the purpose of holding the grapefruit down on the prongs 335 of the fruit carrier of the main turret while the prongs 218 of the transfer turret are moved vertically upwardly out of the grapefruit. This hold down mechanism comprises a downwardly projecting guide tube 400 which is mounted in fixed position in a hub 401 of the support bracket 156 (FIG. 4) and a push rod 402, which is slidable in the guide tube 400 and has a cylindrical chamber 402a in its lower end portion that is partially closed by a bushing 403 secured therein. A spring 405 is disposed between one end wall of the chamber and a nut 406 threaded on the end of a pin 407 that is slidable in the bushing 403 and has a lower circular fruit-contacting head 407a. At its upper end, the push rod 402 is pivotally connected to a lever 410 that is pivotally mounted by means of a pin 411 on the upper end of a support member 412 fixed to the top plate P. A roller follower 414, that is rotatably mounted on lever 410, rides along the peripheral camming surface 415 of a cam 416 which is adjustably secured to a hub 417 keyed to a power driven shaft 418 extending across the top plate P. A tension spring 420 is connected between a bracket 421 secured to plate P and the hooked upper end 422a of a rod 422 that is secured to and projects upwardly from the lever 410. The cam 416 rotates in a counterclockwise direction and, when the roller follower 414 rides along a portion 415a of the camming surface 415, the spring 420 is allowed to pivot the lever 410 counterclockwise and move the push rod 402 downwardly at a relatively slow speed. During this downward movement, the plate 407a contacts the top surface of a grapefruit that is held at transfer station G by the prongs 218 and 335. When the plate 407a contacts the grapefruit, the spring 405 is compressed. The camming surface of cam 416 is so arranged that the hold down plate exerts a downward pressure on the grapefruit until the upwardly moving prongs 218 have cleared the upper end of the grapefruit. Then the follower 414 engages a camming surface 415b which pivots lever 410 and quickly raises the hold down plate 407a, leaving the grapefruit impaled on the prongs 335 of the fruit carrier 332 of the main turret.

When the main turret is next indexed, the grapefruit is moved to station J and is positioned under the second seed disturber unit 40 (FIGS. 12 and 16) which comprises a rod 436 that has a blade holder 437 secured to its lower end. Twelve elongated blades 438 are secured in depending relation in the blade holder. These blades are identical in design to the blades 247 of the first seed disturber unit 245. However, the blades 438 are so arranged on the blade holder and their position is so coordinated with the position of the blades 247 that the blades 438 enter portions of the grapefruit that are spaced angularly around the grapefruit axis from the portions penetrated by the blades 247. Accordingly, the seeds that are not loosened by blades 247 of the first seed disturber unit will be loosened by the second unit 40.

The rod 436 which supports the blade holder 437 passes upwardly through the top plate P and is secured by a setscrew 439, in a bracket 440 which is bolted to the inner surface of a cylindrical wall 441 formed around the top plate P. A stripper plate 450, which is mounted on the tubular support member 339, strips the fruit from the blades 438 as they are moved upwardly.

*Sectionizing Heads of Main Fruit-Processing Turret*

When the grapefruit is moved to station K (FIG. 17), it is positioned directly under the first head 41 which will be described with particular reference to FIGS. 11, 17 and 18. The head comprises a carrier for the sectionizing instruments in the form of a gear housing 465 which has a bottom wall 465a (FIG. 17), an inner cylindrical wall 465b and an outer cylindrical wall 465c. The gear housing is secured to the under side of the top plate P by means of capscrews 467 (one only being shown) and by a bolt 468 (FIG. 11) that secures a tab 469 of the gear housing to the upstanding side wall 441 on the top plate P. Six outer guide tubes 471 are integrally formed on the bottom wall 465a, and project downwardly therefrom. The six outer tubes are formed on a common circle in equi-angular spaced relation around the axis of a central guide tube 470 which, as seen in FIG. 18, projects through the top plate P and has a flange 470a bolted to the top plate. A shaft 472 is slidably journaled for vertical movement in the central guide tube 470. At its lower end the shaft 472 carries a cylindrical prong holder 473 (FIG. 18) having six depending prongs 474 which are disposed in a circular arrangement around the axis of shaft 472. A weight 476 (FIGS. 11 and 18) is secured by a setscrew 477 to the shaft 472 above the top plate P. A vertical rod 478, which is mounted in fixed position in the flange 470a on the top plate P, is slidably engaged in a vertical slot 476a in the weight 476 to prevent rotation of the weight and the shaft 472. Each of the outer guide tubes 471 (FIG. 18) rotatably journals a shaft 486 to which a pinion gear 487 is keyed. The six pinion gears 487 are in mesh with a ring gear 488 that rests on the bottom wall 465a of the gear housing and is arranged to be driven by a drive gear 490 (FIG. 17) that is keyed to a shaft 491 projecting upwardly through the top plate P and a bushing 492 secured thereon. It will be evident that rotary movement of the shaft 491 will cause rotary movement of the ring gear 488 and the six pinion gears 487.

A stationary collar 495 (FIG. 18) is secured by a setscrew 496 to the lower end of each guide tube 471, and a spacer tube 498 is keyed to the shaft 486 below the collar. An articulated blade holder 500 is secured to the shaft 486 by means of a split hub 502a formed on a first arm 502 of the blade holder and is clamped around the shaft. A shaft 504 is secured by a setscrew 505 in a vertical opening in an end portion 502b of the arm 502. A second arm 506 of the articulated blade holder is provided by a generally U-shaped member 507 (FIG. 19) and a blade mounting member 508 (FIG. 18) adjustably secured to the member 507 by capscrews 510. The U-shaped member 507 has two spaced bearing portions 507a and 507b (FIG. 19) which are pivotally disposed around the shaft 504, and the mounting member 508 has two spaced arms 508a and 508b which rotatably journal a rod 512 to the lower end of which an elongated flat blade 513 is welded. The blade has a rear edge 513a in alignment with the axis of rod 512, a forward sharpened edge 513b, and a lower end having a sharpened point 513c spaced forwardly from the rear edge 513a. The rod 512 is urged in a clockwise direction (FIG. 18) by means of a torsion spring 517 which is anchored at its lower end in the arm 508b and at its upper end in a collar 520 fixed to the rod 512. Thus the torsion spring 517 urges the blade 513 to a position wherein the flat face of the blade is tangent to a circle defined by the periphery of the prong holder 473 and tangent to the core of a grapefruit on the prong holder. A split collar 522 is clamped on the upper end of rod 512, and the clockwise movement of rod 512 moves a stop pin 523 (FIG. 20), that projects outwardly from the split collar 522, against a wedge-shaped end 524a of a lever 524. The lever 524 is pivoted on a pin 525, projecting upwardly from the U-shaped member 507, and has an end portion 524b.

A leaf spring 530 (FIGS. 18 and 20) has a curled end 530a disposed in a vertical opening 531 in the stationary collar 495 and an opposite end portion 530b in contact with a bar 532 that is secured to the U-shaped member 507 by capscrews 533 (FIG. 19). The spring tends to pivot the second arm 506 in a counterclockwise direction (FIG. 20) about the axis of pin 504 to a position wherein a pin 538, which projects downwardly from the first arm 502, abuts an ear 540 (FIG. 19) of the U-shaped member 507. Also, during operation, the spring 530 urges the blade holder in a direction to shift the blade laterally toward the adjacent radial membrane during a membrane "finding" operation which will be described hereinafter. The relative positions of the arms 502 and 506 shown in FIG. 20 are the positions of the arms of the articulated blade holder 500 when the head 41 is moved downwardly to carry the blades 513 of the six blade holders into the grapefruit. In FIGURES 20 through 24 the grapefruit is indicated by reference letters GF and the radial membranes by letters RM.

At an early stage in the cutting operation of each blade, the blade is positively turned from the position of FIG. 20, wherein it is generally tangent to the periphery of the cylindrical prong holder 473, to the position of FIG. 22 wherein the blade is pointed in a direction generally radially of the shaft 472. This turning of the blade is accomplished by a cam 550 which is keyed to the upper end of pivot shaft 504. The cam 550 has a fragmentary cylindrical peripheral surface 550a and a flattened surface 550b, with a sharpened corner 550c at one end of surface 550b. The previously mentioned lever 524 is in effect a cam follower lever, with its flattened end 524b lying against the flattened side 550b of the cam. As previously mentioned, when each pinion gear 487 is rotated the associated shaft 486 is rotated. When the shaft 486 is rotated counterclockwise (FIG. 20), the cam 550 is carried bodily in a counterclockwise circular path. In the operation of this first head 41, which will be explained more fully hereinafter, the blade 513 has penetrated down through the grapefruit at the time the gear 487 is rotated counterclockwise. Accordingly, the engagement of the blade in the grapefruit resists the movement of the second arm 506 of the blade holder. The corner 550c of the cam engages the follower lever 524 and pivots it clockwise about pin 525, causing the sharpened end 524a of the lever to swing the rod 512 counterclockwise, whereby the blade 513 is turned to the radial position of FIG. 22. It will be noted that, when the blade turning is accomplished, the corner 550c of the cam passes out of engagement with the flattened side of the follower lever and the peripheral surface 550a of the cam rides along a curved end 555 (FIG. 22) of the lever 524, said curved end being formed on a circle concentric with the peripheral surface 550a of the cam. Therefore the cam 550 locks the second arm 506 in the turned position and, further counterclockwise rotation of the associated pinion gear 487 causes the blade to be pulled radially outwardly along the grapefruit.

In FIGURE 25 the six articulated blade holders 500 of the first head 41 are shown in the position which they assume when the top plate P is in its upper position and the head is ready to be moved downwardly into a grapefruit. It is to be noted that the six blades 513 are disposed close against the prong holder 473 and are substantially tangent to the circle defined by the outer edge of the holder. Also, the six blade holders are spaced 60° from each other, one of the holders 500' being disposed in an imaginary plane, indicated by phantom line 560, that extends radially outwardly from the axis of the turrent and passes through shaft 472 of the head 41, and an adjacent holder 500" being disposed on a phantom radial line 562 which is 60° clockwise from the plane.

The second sectionizing head 42 is identical to head 41 in operation and design. Accordingly, the parts of head 42 will be given the same reference numerals in FIG. 17 as the corresponding parts of head 41, followed by a suffix "A." The heads differ in that the six blades of the head 42 have a different oriented relation to an imaginary radial plane of the turret, indicated respectively by phantom line 561, than the blades of the head 41 have with the radial plane 560. As seen in FIG. 17 the blades of head 42 are disposed 60° apart around the axis of the head, the position of the blade shafts 512A being indicated by dots that are disposed on radial lines 562A, one radial line being disposed 30° clockwise from said radial plane 561, and a second radial line being disposed 30° counterclockwise from said plane. Since the grapefruit is held in fixed position relative to all radial planes of the turret by means of the prongs 335 of the fruit carrier, it will be evident that the lowered pointed ends of the blades of head 42 will enter portions of the grapefruit spaced 30° angularly from the portions entered by the blades of head 41. As previously mentioned, it is the function of the blades to first move laterally to engage a membrane of the grapefruit and then move radially of the grapefruit along the membrane to sever the flesh from the membrane. The staggered relationship of the blades of heads 41 and 42 provides an arrangement whereby different membranes will be sought out by the different blades and, accordingly, a maximum number of membranes be contacted and stripped. As shown in FIG. 17, the third head 43 has six blades disposed at 60° intervals, the blade shafts 512B being disposed on phantom radial lines 562B. One radial line is located 45° clockwise from a radial plane 563 and an adjacent radial line is disposed 15° counterclockwise from said plane. The six blade shafts 512C of the fourth head 44 are also 60° apart, one blade shaft being disposed on a radial line 562C that is 15° clockwise from a radial plane 564 and the adjacent blade shaft being disposed on a radial line 45° counterclockwise from the plane. The above mentioned positioning of the blades in the first three heads 41, 42 and 43 is obtained by rotatably adjusting each gear housing. However, at the fourth head 44 the gear housing is positioned in the same relative position as the gear housing of the second head while each blade holder indicated by phantom line 500C is rotatably adjusted on its shaft 486C to obtain the desired position. Thus, the arrangement is such that the grapefruit is penetrated by the lower pointed end of a blade of one of the four heads at every 15° interval around its core.

The third sectionizing head 43 is substantially identical to the head 41 and the parts of head 43 that are identical to corresponding parts of head 41 will be given identical reference numerals followed by a suffix "B." The head 43 comprises a gear housing 465B (FIG. 17) in which six pinion gears 487B and a ring gear 488B are disposed around a central shaft 472B. Six articulated blade holders 500B (FIG. 27) are supported below the gear housing 465B, each holder being disposed on a shaft 486B that is keyed to one of the pinion gears. The blade holder has two arms 502B and 506B, the arm 502B being clamped to the shaft 486B, and the arm 506B being made up of a U-shaped member 507B and a mounting member 508B that is adjustably secured thereto. The member 507B is identical to the U-shaped member 507 shown in FIGURE 19 except that the abutment ear 540B appears on the upper arm of the member rather than on the lower arm, as in FIGURE 19. Thus the member 507B is identical to member 507 but is inverted. A blade 513B (FIG. 27) is urged in a counterclockwise direction about the axis of shaft 512B by a torsion spring 517B, and a leaf spring 530B is anchored in a fixed collar 495B and engages a bar 532B to urge the articulated blade holder to the straightened position of FIG. 28, wherein a pin 538B engages the abutment arm 540B.

The blade turning mechanism of head 43 differs from that of head 41 in that a cam 575, which is keyed to a shaft 504B, has a cutout portion defined by two flat side surfaces 576 and 577. A cam follower lever 578, which is pivoted on a pin 525B, has a portion 578a lying flat against the side surface 577 of lever 578. After the blade 513B has been moved downwardly through the grapefruit, the pinion gear 487B is rotated causing the outer end of the cam surface 577 to engage and pivot the follower lever 578 which, in turn, pivots the blade through a pin 523B projecting from a collar 522B clamped on shaft 512B on which the 513B is secured. When the blade 513B is turned to the radial position of FIG. 30, the outer end of the cam surface 577 passes out of engagement with the lever 578 and thereafter the outer cylindrical surface of the cam is in contact with the end of the lever.

It will be recognized that, in order for pie-shaped meat segments to be cut loose from the radial membranes, both faces of each membrane must be scraped by the blades. In FIG. 22 it will be noted that the shaft 486, carrying a blade holder 500 of head 41, is rotated in a counterclockwise direction causing the blades to move in a direction, which will be designated as forwardly, in the grapefruit to contact a membrane and then move radially outwardly along the rear face of the membrane of the grapefruit. In distinction, the shaft 486B (FIG. 30), carrying the blade holder 500B of the third head 43, is rotated clockwise causing the blades 513B to move rearwardly in the grapefruit to contact and move radially outwardly along the forward face of a membrane. Thus, the blades of the first and second heads cut loose one side of the pie-shaped sections of grapefruit meat while the blades of the third head cut loose the other side of the pie-shaped sections. As will appear presently the blades of the fourth head move in the same direction as those of the third head.

The fourth sectionizing head 44 is substantially identical to the first head 41 and the parts of head 44 that are identical to corresponding parts of head 41 will be given identical reference numerals followed by a suffix "C." The head 44 comprises a gear housing 465C (FIG. 17) in which six pinion gears 487C and a ring gear 488C are disposed around a central shaft 472C. Six articulated blade holders 500C (FIG. 31) are supported below the gear housing 465C, each holder being disposed on a shaft 486C that is keyed to one of the pinion gears. The blade holder has two arms 502C and 506C, the arm 502C being clamped to the shaft 486C, and the arm 506C being made of a U-shaped member 507C and a mounting member 508C that is adjustably secured thereto. A blade 513C is urged in a counterclockwise direction about the axis of shaft 512C by a torsion spring 517C, and a leaf spring 530C is anchored in a fixed collar 495C and engages a bar 532C to urge the articulated blade holder to the straightened position of FIG. 32.

The U-shaped member 507C is identical to the member 507B of the third head 43 (FIG. 27). Also a cam 575C, which is keyed to a shaft 504C, is identical to the cam 575 of head 43, having a surface 577C arranged to engage and pivot a follower lever 578C which, in turn, pivots the blade 513C through a pin 523C projecting from a collar 522C clamped on the shaft 512C.

The fourth head 44 differs from the three previous heads in that a pin 538C, which cooperates with the abutment ear 540C to determine the straightened position shown in FIG. 32, is provided with a lower extension 538C' (FIG. 31). One end 602a of a flat spring 602 abuts the pin extension 538C' while the other end 602b of the spring 602 is secured in a slot 603 formed in a lower end portion 532C' of the bar 532C. This spring 602 resists the tendency of the blade holder to collapse or jack-knife as the shaft 486C is rotated.

In FIG. 32 is shown the position of the blade 513C when the blade is moved downwardly into the grapefruit. Just after the rotation of the shaft 486C is begun, the cam 575C turns the blade toward a radial position (FIG. 33). However, at this stage the grapefruit has already been acted on by the first three heads and is no longer firmly held in place in the fruit carrier by the fruit carrier prongs. Accordingly, as the blades 513C of the fourth head move outwardly toward the periphery of the grapefruit, the grapefruit tends to move away from the blades. The extra leaf spring 602 resists the early jack-knifing of the blade holder and causes the blade to move in a sweeping arc to maintain contact with the yielding membrane RM, as shown in FIGURES 34 and 35.

The blades of all four heads are rotated and the membrane "finding" lateral movement of the blades of the first and second head is accomplished by a mechanism mounted on top of the tool carrier or top plate P. Referring to FIGURE 17 it will be noted that the ring gear of each of the four sectionizing heads is in mesh with a drive gear 490 which is keyed to one of the shafts 491, 491A, 491B or 491C. A link 625 is pivotally connected to an arm 626 clamped on shaft 491C and to an arm 627a of a lever 627 that has a second arm 627b clamped on shaft 491B. A link 630 is pivotally secured to the lever 627 and to a bar 631 that is bolted to a slide bar 632. Similarly, a link 636 pivotally interconnects arms 637 and 638 which are clamped on the shafts 491A and 491 respectively. A link 640 is pivotally connected to the link 636 and to a lever 642 that is pivotally mounted on the slide bar 632 by a capscrew 643.

The slide bar 632 is mounted in spaced bearings 645 and 646 for sliding movement from left to right (FIG. 17) across the top plate P. Movement of the slide bar to the left causes simultaneous rotation of the pinions of all four heads in a direction to move the blades from their initial position adjacent the core of the grapefruit radially outwardly through the grapefruit. Movement of the slide bar to the right causes the blades to be withdrawn to their initial position adjacent the grapefruit core. Sliding reciprocating movement of the bar 632 is obtained by means of a face cam 650 (FIG. 36) which is keyed to the power driven shaft 418 extending across top plate P. A roller follower 651, which is disposed in a cam track 652 of the cam, is carried by a lever 654 that is pivotally mounted at its upper end on a pin 655 projecting from a fixed bracket 656. At its lower end the lever 654 is pivoted to a link 658 that is pivotally connected by a pin 659 to a pair of ears 660 projecting upwardly from the slide bar 632.

The cam track 652 is so designed that when the roller 651 reaches a position indicated by radial line 663, the slide bar 632 is at the end of its movement to the right. The slide bar remains at this position until position 664 is reached at which time the slide bar is moved toward the left to rotate the pinions and move the blades outwardly along the membranes of the grapefruit until position 665 is reached. The slide bar remains at its leftmost position while the roller moves from cam position 665 to position 666 and thereafter the slide bar is moved toward the right to rotate the pinions in a reverse direction to move the blades back into their initial position adjacent the prongs 474.

The lever 642 is normally held in the phantom line position of FIG. 17 by a spring 670 which is disposed around a rod 671 between the lever 642 and an abutment member 673 adjustably secured to a plate 674 fixed to the slide bar. The rod 671 is secured to the lever 642 and is slidably disposed in an opening 677 in the adjustable abutment member 673. During the last part of the movement of the slide bar to the right (FIG. 17) the lever 642 contacts an end 680a of an arm 680 that is pivotally mounted on the rod 436 of the second seed disturber unit 40. The lever 680 is urged in a counterclockwise direction by a spring 684 to the position of FIG. 17 against a stop pin 685 projecting upwardly from the top plate P. The lever 680 has a hub 680b (FIG. 26) in which a tube 687 is secured by a setscrew 688. The tube is journalled for rotation in a bearing 690 secured to the top plate P and has an arm 691 (FIG. 17) projecting radially outwardly therefrom. A roller 693 is mounted on the other end of the arm 691 directly above a post 696 which is mounted in stationary position on the flat bar 362 which, as previously mentioned, is secured to the vertical tubular bearing member 338.

Referring again to FIG. 17, when the lever 642 contacts the end of lever 680 at the end of the movement of the slide bar, the lever 642 is pivoted counterclockwise about capscrew 643 against the resistance of spring 670 and moved into contact with a stop pin 702 on the plate 674. This pivoting movement of the lever 642 causes the pinions of heads 41 and 42 and the shafts 486 (FIG. 20) to be rotated a few degrees in a clockwise direction so that the several blade holders are held in a spring-loaded, cocked position. While the slide bar is held at right side of top plate P, the plate P is lowered, bringing the roller 693 (FIG. 26) into engagement with a slanted camming surface 705 formed on the post 696. The camming surface causes the arm 691 to be swung clockwise (FIG. 17) about the axis of rod 436, moving the end 680a of arm 680 out of contact with lever 642. The spring 670 quickly swings the lever 642 clockwise, causing the pinion gears to be rotated whereby each blade 513 is moved in a direction generally tangent to the prong holder 473 from the position of FIG. 20 to the position of FIG. 21. This preliminary sidewise movement of the blade, which may also be considered as being in a direction generally normal to a radial plane of the grapefruit, causes the blade to move toward and into engagement with the adjacent membrane of the grapefruit. Thus, the mechanism for moving the blade holder to a spring-loaded, cocked position provides means whereby each blade seeks out the adjacent membrane before the blade is positively turned to its radial position.

At station R (FIGS. 2 and 16) the grapefruit, which has been acted on by the four sectionizing heads, is positioned directly below the spinner or section stripping unit 45. This unit comprises a shaft 750 which is journalled for rotation in a tubular bearing 751 which is formed on a plate 752 bolted to the top plate P. The shaft is held against axial movement in the bearing by a collar 754 and a hub 755 of a gear 756. At its lower end, the shaft carries a generally cylindrical blade holder 758 to which a plurality of blades 759 are fixed in depending relation, each blade is disposed generally tangent to the blade holder and has a tapered end 759a which facilitates the entry of the blade into the grapefruit at this station. The gear 756 is keyed to the upper end of shaft 750 and is in mesh with a gear 761 that is secured by a setscrew 762 to a stub shaft 763 rotatably mounted in a bearing 764 of the top plate P. A link 770 is pivotally connected by a two-way pivoting joint 771 to a pin 772 projecting upwardly from the gear 761. A similar joint 773 connects the other end of the link 770 to a cam follower lever 774 which is pivotally mounted on a pin 775 provided on the upper end of a rigid plate portion 776 of a bracket 777 bolted to the top plate P. A roller 780 is rotatably mounted on the cam 416 adjacent the periphery thereof in position to engage the edge of lever 774 and swing the lever counterclockwise (FIG. 16) against the resistance of a spring 781 which is connected between the lever 774 and the top plate P. When the lever 774 is swung counterclockwise, the gear 761 (FIG. 2) is rotated clockwise, causing the gear 756 and the attached blades 759 to be rotated counterclockwise.

During the operation of the machine the grapefruit with its loosened sections is moved to a position under the spinner 45 when the spinner is in elevated position with the top plate P. When the plate is subsequently moved downwardly, the blades penetrate into the grapefruit at positions radially outwardly of the grapefruit core and outwardly of the pins 335 of the associated fruit carrier which grip the core. After the blades are in position in the grapefruit, the spinner is rotated by the action of cam 416 causing the blades to strip the loosened sections from between the membranes. As the blades rotate and the sections are wedged out away from the stationary core, the stripped membranes are wrapped around the core. The spinner is then raised and, when it is free of the grapefruit, the spring 781 swings the lever 774 clockwise (FIG. 16) to return the spinner to its initial position.

At station S (FIG. 1) the grapefruit core with the membranes wrapped therearound is positioned under the elongated sheet metal stripper tube 790 (FIG. 37) which projects upwardly through the top plate P and is provided with a flange 791 that is bolted to the top plate. A downwardly inclined chute 793 is secured in an opening 794 formed in the tube at a point spaced above the lower end thereof. Four slots 797 (three only being shown) are disposed at 90° intervals around the lower end of the tube, each slot being arranged to receive a stripper finger 798 which has a pointed end 798a and is pivotally mounted exteriorly of the tube on a pair of radially projecting ears 800 formed on the tube. The stripper fingers are held in the full-line position of FIG. 37 by a coil spring 802 which encircles the tube 790 and is disposed in a recess 803 in the upper end of each of the four fingers.

When the top plate P is lowered, the lower end of the tube 790 moves down to a position encircling the grapefruit core and the prongs 335 which hold the core. The stripper fingers are pivoted outwardly, permitting the core to pass into the tube. When the top plate is subsequently raised, the pointed ends of the fingers engage the core and strip it from the prongs of the fruit carrier. An inclined deflector 804 is secured across the inside of the tube 790 just above the opening 794. As grapefruit cores are accumulated in the tube, the deflector 804 guides the uppermost cores out the opening and onto the discharge chute 793.

The discharge conveyor 46 (FIGS. 1 and 2) comprises a pair of aligned endless belts 820 and 821 which may be made of rubber of a plastic material. The belt 820 is disposed below stations M, N and R to receive fruit segments and seeds that drop out of the fruit carriers at these stations. The belt 820 is trained around an idler roller 823 (FIG. 1) and a drive roller 824 which is keyed to a drive shaft 825. A sprocket and chain drive mechanism 828 connects shaft 825 to a drive roller (not shown) around which the belt 821 is trained. As seen in FIG. 1 the discharge end of belt 820 is positioned in spaced relation above the receiving end of belt 821. The arrangement is such that grapefruit segments will fall from belt 820 onto belt 821 as they pass over the discharge end of the belt. However, seeds and other fruit fragments, which are relatively light in weight and adhere to the relatively sticky surface of the belt 820, will be carried around the belt through the opening between the belts and will be discharged from the undersurface of the belt 820 at a point spaced from the receiving end of the belt 821. The opening between the belts is large enough to pass seeds and fragments but not large enough to pass meat segments. While the grapefruit juice ordinarily makes the belt tacky enough for the present purposes, additional tacky material may be applied to the belt if necessary. Thus, the spaced belts provide a means for automatically separating the grapefruit sections from the seeds and other fragments. It will be understood that one or more additional belts may be used to separate the grapefruit sections on belt 821 from any fragments that are not separated at the above-described first separation mechanism.

Drive Mechanism

The drive mechanism of the grapefruit sectionizing machine will be described with particular reference to FIGURES 12 and 39. The shaft 305 to which the barrel cam 306 is keyed is continuously rotated by a chain 850 which is trained around sprocket 308 and around a sprocket 851 keyed to an output shaft 852 of a transmission unit 853. A motor 854 is connected in driving engagement to an input shaft 856 of the transmission by a belt and pulley drive 858. Since the shaft 305 not only drives the barrel cam which controls vertical reciprocation of the top plate P but also drives the Geneva mechanism 313–314 which effects intermittent indexing of the main turret H, it is evident that the vertical reciprocation of the top plate P and the indexing of the main turret are carried on in timed relation.

Similarly the indexing movements of the feed turret B and the transfer turret E are coordinated with the indexing movements of the main turret H by means of a chain 860 which is trained around a sprocket 861, secured by a setscrew 862 (FIG. 12) to the turret shaft 316, and around the sprockets 85 and 204 which are fixed to the feed turret shaft 80 and the transfer turret shaft 198 respectively. The sprockets are so designed that a 45° rotation of sprocket 861 causes a 90° rotation of each of the sprockets 85 and 204.

The drive shaft 825 which drives the discharge conveyor 46 is driven from the continuously rotating main shaft 305 by means of a belt 875 which is trained around pulley 312 on shaft 305 and around a pulley 876 keyed to drive shaft 825 and around two suitably supported guide pulley 877 and 878. The conveyor drive shaft is connected in driving engagement with the drive shaft 53 of the feed conveyor A by means of gears 882 and 883, a shaft 884, and a chain and sprocket mechanism 885.

The drive shaft 418, which extends across the top plate P and carries cams 416 and 650, is driven by a chain 888 that is trained around a sprocket 889 keyed to shaft 418 and around a sprocket 890 keyed to a shaft 891. As seen in FIGURE 2, the shaft 891 is journalled for rotation in a bearing 893 that is supported by a flange 894 (FIGS. 2 and 12) carried by the tubular bearing 338. A bevel gear 900, which is keyed to shaft 891, is in mesh with a second bevel gear 901 keyed to a vertical shaft 902 that is journalled for rotation in the tubular bearing 338, the support tube 339 and the base 303. The vertical shaft 902 is driven by a chain 905 trained around a sprocket 906 keyed to shaft 902 and around the sprocket 309 keyed to the main turret shaft 305.

As previously mentioned, the cam 416 controls the operation of the hold down member 407 (FIG. 16) at station G, and the spinner at station R, and the cam 650 controls the sliding reciprocating movement of the slide bar which in turn controls the movement of the sectionizing blade holders 500. Accordingly, it will be evident that the transfer operation at station G and the sectionizing operations of the heads 41, 42, 43 and 44 are carried on in coordinated relation with the main turret shaft 305 which controls the indexing of the turret and vertical reciprocation of the top plate P.

In FIGURE 40 a series of graphs is shown which trace the coordinated movements of the various elements of the mechanisms mounted on the top plate P during one complete rotation of the barrel cam 306 which controls the vertical movement of the top plate. The zero degree position of the barrel cam is that position at which the tool carrier top plate P is just starting downwardly. At this time all the blades of the four heads are disposed close in against and generally tangent to their associated prong holders. At approximately 30° of cam rotation, the blades have penetrated approximately one inch down into the grapefruit. At this point, the roller 693 (FIG. 26) engages the fixed camming surface 705 causing the preset or cocked blades of the first and second heads to be moved quickly toward the adjacent membrane to "find" the membrane. When the blades have contacted the membranes, the blades are held in that position while their downward movement is continued. At approximately 60° of cam rotation, the blades have penetrated all the way through the grapefruit. At this point, the slide bar on the top of carrier plate P rotates the pinion gears causing the blades to be turned and then moved outwardly toward the periphery of the associated grapefruit, the blades of the first, second and fourth heads moving all the way out of the grapefruits while the blades of the third head only move approximately half way to the periphery of the grapefruit. The spinner blades, which are shorter than the blades of the sectionizing heads, enter the grapefruit at about 80° of cam rotation. At about 150° of cam rotation, the rotation of the spinner is begun and, at 200°, when the spinner blades are above the grapefruit core, the rotation is reversed. At about 250°, the rotation of the spinner is stopped. The time at which the rotation of the spinner is started and stopped may be varied somewhat. It is desirable that the forward rotation of the blades be carried out while the blades are disposed around the core, and the reverse rotation should take place after the blades are moved to a position spaced above the core.

It will be noted that the outward movement of the blades of all four heads stop at about 105° and the blades dwell in their outermost positions until approximately 260° when they are moved inwardly toward the associated prong holder near the axis of the head. At 350° of cam rotation the blades reach their innermost position and are held there until the next down movement of the head.

Referring to FIGURES 38 and 39 it will be noted that, when the top plate P moves downwardly, the shaft 418 also moves downwardly but the shaft 891 remains in its fixed elevated position. Accordingly, the effective length of the chain 888 changes during vertical reciprocation of the top plate P. A chain tightener 910 is provided which comprises two small sprockets 911 and 912 rotatably mounted on a lever 913, said sprockets being arranged to engage opposite sides of the chain 888. The lever 913 is pivotally mounted on a standard 914 secured to the top plate P. A rod 915, which has an upper end pivotally connected to an end 913a of the lever 913 adjacent the sprocket 912, projects downwardly through an opening in the top plate P. A spring 916 is disposed around the rod 915 and is positioned between the lever end 913a and the top plate P and is arranged to urge the lever end 913a upwardly away from the plate P.

When the plate P and the shaft 418 move downwardly, the chain 888 tends to straighten out and pivot the lever 913 against the resistance of spring 916. Conversely, when the plate P moves upwardly, the spring 916 pivots the lever 913 in a direction which is effective to restore the turns in the chain and cause it to remain in taut operating condition.

Referring to FIGURE 17, it will be noted that a safety switch 920 is mounted on each of the arms 637 and 638 of the gear actuating mechanism. The normally open contacts of each switch is held closed by a projection on a collar 922 setscrewed to each of the shafts 491 and 491A. If, during operation, any of the blades of the first or second sectionizing heads becomes jammed or for any reason is rotated from its proper position, the projection of the associated collar 922 will move away from the switch actuator, permitting the switch to open and deenergize the circuit in which the motor 854 is connected, whereby the entire machine is stopped.

Operation

The operation of the machine will be explained with particular reference to FIGURES 1 and 2. When the various units are all operating in the above-mentioned coordinated manner, a peeled grapefruit is advanced to the discharge end of feed conveyor A where it contacts and closes switch 74 (FIG. 2), deactivating the clutch 56 and stopping the feed conveyor. The operator lifts the grapefruit off the conveyor and places it on the upstanding positioning member 102 of feed turret B with the blossom end of the peeled grapefruit in contact with the projections 102a. The grapefruit is then swung downwardly with the positioning member to bring the grapefruit under the centering light 115. When the grapefruit is centered, the operator actuates the handle 135 and swings the clamp arm 120 into clamping engagement with the top of the grapefruit.

The next two indexing movements of feed turret B bring the clamped grapefruit to transfer station D where a set of prongs on the overhead prong carrier plate 191 of transfer turret E are moved downwardly to pierce and grip the grapefruit. During this downward movement of the carrier the spring clamp 225, associated with the particular set of prongs, is moved into gripping engagement with the side of the grapefruit. Also, during the downward movement of the prong carrier of the transfer turret, the roller 154 (FIG. 1) releases the brake associated with the clamp arm 120, permitting the arm 120 to be swung upwardly away from the grapefruit. When the prong carrier plate 191 is next moved upwardly, the grapefruit, which is clamped on the prongs by the spring clamp, is also raised upwardly away from the feed turret B.

The next indexing movement of the transfer turret E brings the elevated grapefruit into position at station F above the first seed disturber unit 245. As the prong carrier of transfer turret E moves downwardly, the prongs 474 of the weighted shaft 472 penetrate into the grapefruit to hold it in position in the carrier and the relatively thin blades of the seed disturber penetrate the grapefruit close to the core and contact and loosen the seeds from the flesh of the grapefruit. The clamped grapefruit is then carried upwardly away from the seed disturber and, when the transfer turret E is next indexed, the grapefruit is positioned at station G above a fruit carrier of the main turret H.

At station G (FIG. 4) the clamped grapefruit is carried down onto the prongs 335 of a fruit carrier 332 of the main turret and, during the next upward movement of the top plate P, the hold down member 407 holds the grapefruit in the fruit carrier while the prongs on the transfer turret are lifted out of the grapefruit.

On the main turret H, the grapefruit is first moved to station J under the second seed disturber unit 40. While the grapefruit is held at station J, the seed disturber unit is moved downwardly, causing the blades of the unit to penetrate down into the grapefruit, at areas spaced angular relative to the stem-blossom axis of the grapefruit from the areas penetrated by the blades of the first seed disturber unit 245.

The next indexing movement of the main turret positions the grapefruit at station K under the first head 41. Referring to FIGURES 20 through 24 it will be seen that when the head is in its elevated position spaced above the grapefruit, each blade holder is moved inwardly toward the axis of the head to a position wherein the blade 513 is disposed closed against and generally tangent to the prong holder 473. At this time the slide bar on top of the top plate P moves across the plate to rotate each pinion gear in a reverse direction to move the blade holder to the spring-loaded, cocked position of FIG. 20. Then, when the head 41 is moved downwardly and the blades have penetrated down into the grapefruit approximately 1 inch, the blade holder is released from its restrained position, causing the spring 670 (FIG. 17) to quickly rotate the drive gear 490 of head 41. This rotary movement of gear 490 effects a small rotary movement of each pinion whereby the associated blade is moved in a path generally tangent to the periphery of the prong holder 473 to seek out and contact the closest grapefruit membrane. This jump action or membrane-finding action of each blade is illustrated in FIG. 21.

After the blades have been moved down through the grapefruit, the pinion gears 487 are rotated causing the cam 550 of each blade holder to positively swing the blade to a position disposed alongside the grapefruit membrane and generally radially of the grapefruit. Further rotation of the pinion gears causes the blades to be moved radially outwardly of the grapefruit, as seen in FIG. 23 until the blades pass out of the grapefruit as shown in FIG. 24. During this outward movement, the blade is urged against the membrane by the torsion spring 517 and by the leaf spring 530. After the head has been raised, the blades are moved radially inwardly, by the action of the slide bar on the top plate P, to bring the blades to their initial position adjacent the prong holder 473.

The grapefruit is then moved to station L under the second head 42. The actions of the second head in penetrating into the grapefruit, seeking out the membrane, and moving radially outward through the grapefruit are identical to the actions of the first head 41 except that the blades of head 42 penetrate into the grapefruit at areas around the grapefruit core that are spaced 30° from the areas penetrated by the blades of head 41. Thus, after the grapefruit has been processed by the blades of the second head, the grapefruit has been penetrated at every 30 degree interval around the core.

When the grapefruit is positioned under the third head at station M, the blades of that head are moved downwardly through the grapefruit and then are positively swung in a direction to engage the opposite side of the membranes from the side contacted by the blades of the first head. Thus, while the blades of the first and second heads move along what may be designated the rear face of the membranes, the blades of the third and fourth heads move along the forward face of the membrane. It is to be particularly noted that the blades of the third head do not move all the way out through the grapefruit but are stopped at a point approximately half way out as shown in FIG. 30. The portions of the bond between the membrane and the fruit that is left uncut by the blades of the third head will readily be broken later at station R by the spinner or stripper unit 45. Meanwhile by leaving these uncut portions, the grapefruit is kept in a more or less intact condition so that the blades of the fourth head can effectively cut loose the flesh portions of the fruit from the membranes which these particular blades contact. The blades of the third head move only about half way out to the periphery of the grapefruit, while the blades of the other head move past the periphery, due to the fact that the lever 627 (FIG. 17), which is connected to the gear shaft 491B, is longer than the levers 626, 637, and 640 connected to the gear shafts of the other heads.

As seen in FIGS. 32 through 35, the blades of the fourth head are moved down through the fruit and then are turned and moved outwardly along the membranes. Due to the action of the extra spring 602, the blade holders of the fourth head do not collapse or jack-knife readily and, as a result, if the membrane tends to yield when contacted by a blade, the blade will follow the membrane along a sweeping arcuate path as shown in FIGS. 34 and 35. Thus, the blade holders of the fourth head provide a means for stripping the grapefruit sections even from yielding membranes.

It will be noted that, as previously mentioned, the blades of the first two heads are so positioned that each grapefruit is penetrated at each 30° interval. The blades of the third and fourth heads are so positioned that the blades of the third head enter the grapefruit at areas spaced in the middle of six of the above-mentioned 30° intervals, and the blades of the fourth head split the other six 30° intervals. Thus, the blades of the four heads penetrate the grapefruit at every 15° interval.

After the grapefruit has been processed by all four heads, it is moved to station R under the spinner or stripper unit 45. When the top plate P is next lowered, the blades of the stripper unit penetrate down into the grapefruit and, when the blades extend all the way through the grapefruit, the blades are rotated. The blades contact the membranes of the stationary core and wrap them around the core, while stripping the grapefruit sections from the membranes. After the rotation of the spinner blades is stopped and the unit is raised out of contact with the grapefruit core, the blades are rotated in an opposite direction to bring it to its initial position. It will be appreciated that, due to the multiplicity of blades some grapefruit sections may be completely cut loose from the membranes and drop from the fruit carrier onto the belt 820 before station R is reached. However, the large majority of the sections will be released from the carrier after the spinning operation.

The grapefruit core with the membranes wrapped therearound is then moved to station S where the stripper tube is moved downwardly over the core. When the top plate is again raised, the pointed ends of the stripper fingers of the stripper mechanism contact the core and lift it out of the fruit carrier of the main turret.

It will be understood of course that a plurality of grapefruits may be processed simultaneously in this machine since there are eight fruit carriers on the main turret and four fruit carrying mechanisms on both the feed turret and the transfer turret.

It will be understood that modification and variations may be effected without departing from the scope of the novel concepts of the present invention.

Having thus described my invention what I claim as new and desire to protect by Letters Patent is:

1. A machine for processing citrus fruit, a fruit-processing turret, a plurality of symmetrical fruit holders mounted on said turret, each holder being adapted to support a peeled fruit in fixed position on the turret with the axis of the fruit substantially on the axis of the holder, four sectionizing heads mounted above said turret, means for rotating said turret in predetermined angular increments to position each fruit holder successively under each of said heads, six blades mounted in depending relation in each head in a circular formation with the axis of the circle coinciding with the axis of each fruit holder when the head is disposed thereabove, means for moving said heads downwardly to move the blades of each head into engagement with a fruit held therebelow in one of said holders, each blade having angular position relative to a radial plane of the turret passing through the axis of each fruit holder different than the angular position of each of the other blades relative to said radial plane, whereby a fruit on each holder is penetrated by one of the blades at each 15 degree interval around its axis.

2. In a fruit processing machine, a transfer turret having a plurality of spaced arms, a fruit carrier on the end of each arm, a feed turret having means for supporting a fruit in a position directly below the fruit carrier on one of said arms, a plurality of seed loosening members mounted in fixed position at the level of said fruit support means and directly below the fruit carrier on a second of said arms, a fruit-processing turret having a fruit holder positioned at the level of said seed loosening members below the fruit carried on a third one of said arms, and means for moving said transfer turret downwardly to a lower position to move the fruit carrier of said first arm into engagement with a fruit held in the fruit support means of said feed turret, and to impale on said seed loosening members a fruit carried by the carrier on said second arm, and to position a fruit carried by the carrier of said third arm in the fruit holder of said fruit-processing turret.

3. In a fruit processing machine, a transfer turret having a plurality of spaced arms, a fruit carrier on the end of each arm, a feed turret having means for supporting a fruit in a position directly below the fruit carrier on one of said arms, a plurality of seed loosening members mounted in fixed position at the level of said fruit support means and directly below the fruit carrier on a second of said arms, a fruit processing turret having a fruit holder positioned at the level of said seed loosening members below the fruit carrier on a third one of said arms, means for moving said transfer turret downwardly to a lower position to move the fruit carrier of said first arm into engagement with a fruit held in the fruit support means of said feed turret, and to impale on said seed loosening members a fruit carried by the carrier on said second arm, and to position a fruit carried by the carrier of said third arm in the fruit holder of said fruit-processing turret, each of said fruit carriers including an impaling unit and a clamp member movable between a position of engagement with a fruit disposed on said impaling unit and a withdrawn position, and means responsive to downward movement of said transfer turret and operative as the fruit carriers on said transfer turret approach said lower position for moving the clamp member of the fruit carrier on said first arm into gripping engagement with the fruit in the fruit support of said feed turret and operative to move the clamp member of the carrier on said third arm away from the fruit held on the associated impaling unit.

4. A fruit processing machine comprising a transfer turret having a plurality of spaced arms and a fruit carrier on each arm, means mounting said transfer turret for rotation to successively position each fruit carrier at a feed station, a seed disturbing station and a transfer station, a feed turret disposed adjacent said transfer turret and having a plurality of spaced fruit support members, means mounting said feed turret for rotary movement to successively move one of said fruit support members under one of the fruit carriers on said transfer turret at said feed station, a seed disturbing blade unit disposed in fixed position under said turret at said seed disturbing station, a fruit processing turret disposed adjacent said transfer turret and including a plurality of fruit holders spaced around the periphery of the fruit processing turret, means mounting said fruit processing turret for rotary movement to successively move one of said fruit holders under one of the fruit carriers at said transfer station, a tool carrier mounted above said fruit processing turret, a plurality of tools mounted on said tool carrier, one tool being disposed in vertical alignment with each fruit holder on said fruit processing turret, and interconnecting means mounting said transfer turret and said tool carrier for downward movement to simultaneously move the fruit carrier of said transfer turret at said feed station into engagement with a fruit disposed in a fruit support member of said feed turret, and move a fruit carried in the fruit carrier of said transfer turret at the seed disturbing station into impaled position on said seed disturbing blade unit, and position a fruit carried by the fruit carrier at said transfer station in a fruit holder of said fruit processing turret, and move the tools of said tool carrier into operative engagement with fruit disposed in the fruit holders of said fruit processing turret.

5. A fruit processing machine comprising a transfer turret having a plurality of spaced arms and a fruit carrier on each arm, means mounting said transfer turret for rotation to successively position each fruit carrier at a feed station, a seed disturbing station and a transfer station, a feed turret disposed adjacent said transfer turret and having a plurality of spaced fruit support members, means mounting said feed turret for rotary movement to successively move one of said fruit support members under one of the fruit carriers on said transfer turret at said feed station, a seed disturbing blade unit disposed in fixed position under said turret at said seed disturbing station, a fruit processing turret disposed adjacent said transfer turret and including a plurality of fruit holders spaced around the periphery of the fruit processing turret, means mounting said fruit processing turret for rotary movement to successively move one of said fruit holders under one of the fruit carriers at said transfer station, a tool carrier mounted above said fruit processing turret, a plurality of tools mounted on said tool carrier, one tool being disposed in vertical alignment with each fruit holder on said fruit processing turret, interconnecting means mounting said transfer turret and said tool carrier for downward movement to simultaneously move the fruit carrier of said transfer turret at said feed station into engagement with a fruit disposed in a fruit support member of said feed turret, and move a fruit carried in the fruit carrier of said transfer turret at the seed disturbing station into impaled position on said seed disturbing blade unit, and position a fruit carried by the fruit carrier at said transfer station in a fruit holder of said fruit processing turret, and move the tools of said tool carrier into operative engagement with fruit disposed in the fruit holders of said fruit processing turret, and drive means operatively connected to the mounting means of said feed turret, said transfer turret and said fruit processing turret for intermittently indexing said turrets in predetermined coordinated angular increments.

6. A fruit processing machine comprising a transfer turret having a plurality of spaced arms and a fruit carrier on each arm, means mounting said transfer turret for rotation to successively position each fruit carrier at a feed station, a seed disturbing station and a transfer station, a feed turret disposed adjacent said transfer turret and having a plurality of spaced fruit support members, means mounting said feed turret for rotary movement to successively move one of said fruit support members under one of the fruit carriers on said transfer turret at said feed station, a seed disturbing blade unit disposed in fixed position under said turret at said seed disturbing station, a fruit processing turret disposed adjacent said transfer turret and including a plurality of fruit holders spaced around the periphery of the fruit processing turret, means mounting said fruit processing turret for rotary movement to successively move one of said fruit holders under one of the fruit carriers at said transfer station, a tool carrier mounted above said fruit processing turret, a plurality of tools mounted on said tool carrier, one tool being disposed in vertical alignment with each fruit holder on said fruit processing turret, interconnecting means mounting said transfer turret and said tool carrier for downward movement to simultaneously move the fruit carrier of said transfer turret at said feed station into engagement with a fruit disposed in a fruit support member of said feed turret, and move a fruit carried in the fruit carrier of said transfer turret at the seed disturbing station into impaled position on said seed disturbing blade unit, and position a fruit carried by the fruit carrier at said transfer station in a fruit holder of said fruit processing turret, and move the tools of said tool carrier into operative engagement with fruit disposed in the fruit holders of said fruit processing turret, and drive means operatively connected to the mounting means of said feed turret, said transfer turret, and said fruit processing turret, and to the interconnected mounting means of said transfer turret and said tool carrier for intermittently indexing said three turrets in predetermined coordinated angular increments while holding said tool carrier and said transfer turret in an elevated position, and for moving said interconnected tool carrier and transfer turret downwardly during an interval between indexing movements of said three turrets.

7. In a fruit processing machine, a pair of spaced seed loosening units, each unit having a plurality of thin blades disposed in uniformly spaced relation to define a circle having a diameter adapting the blades to engage the seeds disposed in a grapefruit around the axis thereof, fruit carrier means adapted to hold a fruit with the axis thereof in a generally vertical position, means for actuating said carrier means to successively move a fruit carried thereby to a position of vertical alignment with each of said two seed loosening units,, means for effecting relative vertical movement between said carrier means and each of said units to cause the blades of each unit to penetrate into the grapefruit and engage the seeds, each blade of said units being spaced from each adjacent blade a distance sufficient to permit seeds to be displaced into the spaces between blades, and said units being so oriented that each blade of the units penetrates each grapefruit in a different radial plane of the grapefruit.

8. In a fruit processing machine, a sectionizing mechanism comprising a gear housing, a ring gear mounted for rotation in said housing, a plurality of equally spaced pinion gears disposed in a circular formation in said housing in mesh with said ring gear, a shaft keyed to each pinion gear and projecting through said gear housing, a blade holder keyed to each shaft, a rod slidable in said gear housing and disposed parallel to said shafts on the axis of rotation of said ring gear, fruit impaling members on the lower end of said rod, a blade secured in each blade holder generally parallel to said rod, means for supporting a fruit below said gear housing with the axis of the fruit substantially in alignment with said rod, means mounting said gear housing for downward movement to move said impaling members and said blades into the fruit, and means for rotating said ring gear after said blades have penetrated the fruit whereby to rotate said pinion gears and the shafts keyed thereon and actuate said blade holders for moving said blades in cutting strokes in the fruit.

9. In a fruit processing machine, a sectionizing mechanism comprising means for supporting a fruit in fixed position, a carrier disposed above said fruit support means and mounted for reciprocating movement toward and away from said fruit support means, a shaft mounted for rotation in said carrier, a first arm secured at one end to said shaft, a pivot pin secured in the other end of said first arm, a second arm pivotally mounted at one end on said pivot pin, a blade rotatably supported in the free end of said second arm, means including a first spring connected between said blade and said second arm for holding said blade in a position disposed generally normal to said second arm, a second spring operatively connected between said shaft and said second arm for resiliently holding said first and second arms in longitudinal alignment with each other, a stop pin projecting outwardly from said blade, a turning lever pivoted on said second arm and having an end portion in engagement with said stop pin for turning said blade a predetermined distance in response to pivoting of said lever, a cam keyed to said pivot pin and disposed in engagement with the other end of said turning lever for pivoting said lever in response to pivoting movement of said second arm relative to said first arm, means for moving said carrier downwardly to project said blade while in said normal position down into the fruit on said support means, and means for rotating said shaft after said blade is disposed in the fruit to swing said first arm in a direction to cause relative pivoting of said first and second arms whereby said turning lever is pivoted and said blade is turned shortly after rotation of said shaft is begun, further rotation of said shaft being effective to draw said blade in turned position outwardly toward the periphery of the fruit.

10. In a fruit processing machine, a sectionizing mechanism comprising means for supporting a fruit in fixed position, a carrier mounted above said fruit means for vertical reciprocating movement toward and away from said fruit support means, a shaft journaled for rotation in said carrier, an articulated blade holder having a first arm secured to said shaft for rotation therewith and a second arm pivoted to said first arm, a blade rotatably supported in said second arm, means urging said first and second arms to an aligned position projecting radially from said shaft, means urging said blade to a position generally normal to said second arm, means for moving said carrier downwardly to move said blade down into the fruit on said support means, means for rotating said shaft after said blade is disposed in the fruit whereby to swing said first arm in a direction causing relative pivoting movement of said first and second arms, a lever pivoted on said second arm and having one end portion in operative engagement with said blade for turning said blade in response to pivoting of said lever, and a cam carried by said first arm and arranged to engage and pivot said lever in response to relative pivoting movement of said first and second arms, whereby said blade is turned from said normal position in response to rotation of said shaft.

11. In a fruit processing machine, a sectionizing mechanism comprising means for supporting a fruit in fixed position, a carrier disposed above said fruit supporting means and mounted for reciprocating movement toward and away from said fruit support means, a shaft mounted for rotation in said carrier, a first arm secured at one end to said shaft, a pivot pin secured in the other end of said first arm, a second arm pivotally mounted at one end on said pivot pin, a blade rotatably supported in the free end of said second arm, means normally holding said blade disposed generally normal to said second arm, means for moving said carrier downwardly to cause said blade to penetrate the fruit on said fruit support means, means for rotating said shaft in a direction adapted to move the blade toward an adjacent radial membrane of the fruit, and adapted to cause relative pivotal movement of said first and second arms, and means responsive to said relative pivoting movement for swinging said blade from said normal position to a position in a substantially radial plane of the fruit.

12. In a machine for processing citrus fruit, means for supporting a fruit in fixed position with the axis of the fruit in a generally vertical position, a tool carrier mounted for vertical reciprocating movement toward and away from said fruit support means, a shaft rotatably supported in said tool carrier, a blade holder secured at one end to said shaft for rotation therewith, a blade mounted on the other end of said blade holder, a gear keyed to said shaft, means for vertically reciprocating said tool carrier, control means operatively connected to said gear for holding said blade holder in a predetermined position vertically above said fruit holder such that said blade will be moved into the fruit on said fruit support means at a point adjacent the apex of a meat segment enclosed by two divergent radial membranes of the fruit during downward movement of said tool carrier, and means responsive to downward movement of said tool carrier and operatively connected to said control means for rotating said shaft a small angular amount to shift said blade holder in a direction to move said blade toward and against one of said radial membranes.

13. In a machine for sectionizing citrus fruit, means for supporting a fruit in fixed position with the axis of the fruit in a generally vertical position, a tool carrier disposed above said fruit support means and mounted for vertical reciprocating movement toward and away from said fruit support means, a shaft rotatably supported in said tool carrier, a gear keyed to said shaft, a blade holder secured at one end to said shaft for rotation therewith, a blade mounted at the other end of said blade holder whereby rotation of said shaft caused arcuate movement of said blade, means for vertically reciprocating said carrier, a control linkage operatively connected to said gear and movable to a predetermined setting adapted to hold said fruit holder in a position such that said blade will be moved into the fruit on said fruit support means at a point between two adjacent radial membranes of the fruit, a spring connected between said carrier and said linkage and arranged to urge said linkage in a direction to effect rotation of said shaft, a latch arm arranged to hold said control linkage in said predetermined setting against the resistance of said spring, a cam mounted in fixed position in the path of downward movement of said latch arm and arranged to swing said arm out of latched engagement with said linkage, permitting said spring to actuate said linkage and rotate said shaft to move said blade toward one of the radial membranes of the fruit.

14. In a fruit processing machine, a vertically movable carrier, a rigid lifter member mounted in spaced relation below said carrier for vertical movement with said carrier, means on said carrier for holding a grapefruit in elevated position with the axis of the grapefruit disposed in a generally vertical position, a support member mounted below said fruit holding means and having a vertical central bore, a plurality of seed loosening members projecting upwardly from said support member around said central bore, a plunger disposed in said bore, a link pivotally mounted on the lower end of said plunger, means including a spring operatively connected between said plunger and said support member for urging said plunger to an elevated position with an upper end disposed between said seed loosening members, means for moving said carrier downwardly to position the grapefruit on said seed loosening members and causing the grapefruit to contact and depress said plunger, and cam means disposed in the path of downward movement of said link and arranged to pivot said link to a position overlying said rigid lifter member, whereby upon subsequent upward movement of said carrier said lifter member will contact said link to push said plunger upwardly to exert a force on the underside of the grapefruit tending to raise it off said seed loosening members.

15. A fruit processing machine comprising a transfer turret having a plurality of spaced arms and a fruit carrier on each arm; means mounting said transfer turret for rotation to successively position each fruit carrier at a feed station, a seed loosening station and a transfer station; a feed turret disposed adjacent said transfer turret and having a plurality of spaced fruit support members, means mounting said feed turret for rotary movement to successively move said fruit support members under the fruit carriers on said transfer turret at said feed station; a seed loosening blade unit disposed in fixed position under said turret at said seed loosening station; a fruit processing turret disposed adjacent said transfer turret and including a plurality of fruit holders spaced around the periphery of the fruit processing turret; a pair of oppositely disposed arcuate fruit clamping members pivotally mounted on said processing turret above each fruit support member; a lever mounted for movement with said fruit processing turret and for movement about a fixed pivot adjacent each pair of clamping members; a pair of springs carried by each lever, each spring being arranged to be moved into engagement with one of the pair of fruit clamping members associated with the lever; a cam follower on each lever; a cam mounted in stationary position adjacent said fruit processing turret and having a camming surface adapted to periodically engage each cam follower and pivot the associated lever and the springs connected thereto to move the associated pair of arcuate fruit clamping members into gripping engagement with a fruit disposed on the associated fruit holder; means mounting said fruit processing turret for rotary movement to successively move one of said fruit holders under one of fruit carriers at said transfer station; a tool carrier mounted above said fruit processing turret; a plurality of sectionizing blade units mounted on said tool carrier, one blade unit being disposed in vertical alignment with each fruit support member on said fruit processing turret; and interconnecting drive means mounting said transfer turret and said tool carrier for downward movement to simultaneously move the fruit carrier of said transfer turret at said feed station into engagement with a fruit disposed in a fruit support member of said feed turret, and move a fruit carried in the fruit carrier of said transfer turret at the seed loosening station into impaled position on said seed loosening blade unit, and position a fruit carried by the fruit carrier at the transfer station in a fruit support member of said fruit processing turret, and move the blade units on said tool carrier into operative engagement with fruit disposed in the fruit support members of said fruit processing turret, said stationary cam being arranged to move said fruit clamping members into engagement with fruit in said support members only during rotary indexing movement of said fruit processing turret, and means operated in timed relation to said interconnecting drive means for moving each sectionizing blade radially outwardly of the fruit after said blade is disposed in the fruit.

16. A fruit processing machine comprising a transfer turret having a plurality of spaced arms and a fruit carrier on each arm; means mounting said transfer turret for rotation to successively position each fruit carrier at a seed loosening station and at a transfer station; a seed loosening blade unit disposed in fixed position under said turret at said seed loosening station, each blade of said unit being arranged to penetrate a V-shaped meat segment of a fruit at the apex thereof between adjacent radial membranes of the fruit to engage and loosen seeds along the apex and each blade being spaced from each adjacent blade a distance sufficient to permit seeds to be displaced into the spaces between blades; a fruit processing turret disposed adjacent said transfer turret and including a plurality of fruit holders spaced around the periphery of said processing turret; means mounting said processing turret for rotary movement to successively move one of said fruit holders under one of the fruit carriers at said transfer station; a tool carrier mounted above said fruit processing turret; a plurality of sectionizing blade units mounted on said tool carrier, each blade unit being disposed in vertical alignment with a fruit holder on said fruit processing turret; and interconnecting drive means mounting said transfer turret and said tool carrier for downward movement to simultaneously move a fruit carried in the fruit carrier of said transfer turret at the seed loosening station into impaled position on the blades of said seed loosening blades, and position a fruit carried by the fruit carrier at said transfer station in a fruit holder of said fruit processing turret, and move the blades of said sectionizing unit into the fruit therebelow adjacent the apices of the V-shaped meat segments substantially at the positions previously penetrated by the blades of said seed loosening unit.

17. In a fruit processing machine, a vertically movable transfer turret having a plurality of spaced arms, a fruit carrier on the end of each arm, a feed turret having means for supporting a fruit held in a position directly below the fruit carrier on a first one of said arms, a fruit processing turret having a pair of spaced fruit holders positioned at the level of said fruit supporting means of said feed turret, a first one of said holders being positioned at a position below the fruit carrier on a second one of said arms, a vertically movable tool carrier having a fruit processing unit vertically aligned with the second of said two fruit holders of said processing turret, and means for simultaneously moving said transfer and said tool carrier downwardly to a lower position to move the fruit carrier of said first arm into engagement with a fruit held in a fruit support means of said feed turret, and to position a fruit carried by the carrier of said second arm in the fruit holder of said fruit processing turret, and to move the processing unit of said tool carrier into a fruit in said second fruit holder of said processing turret.

References Cited in the file of this patent
UNITED STATES PATENTS

| | | |
|---|---|---|
| 1,545,114 | Alvey | July 7, 1925 |
| 1,774,355 | Cory | Aug. 26, 1930 |
| 1,802,973 | Gardner | Apr. 28, 1931 |
| 2,129,101 | Polk | Sept. 6, 1938 |
| 2,240,910 | Polk et al. | May 6, 1941 |
| 2,246,896 | Polk et al. | June 24, 1941 |
| 2,283,615 | Skinner et al. | May 19, 1942 |
| 2,417,472 | Dorff | Mar. 18, 1947 |
| 2,560,128 | Polk et al. | July 10, 1951 |
| 2,627,884 | Polk et al. | Feb. 10, 1953 |
| 2,629,479 | Sneed et al. | Feb. 24, 1953 |
| 2,667,963 | Rittenger | Feb. 2, 1954 |
| 2,699,191 | De Back et al. | Jan 11, 1955 |
| 2,738,819 | De Back et al. | Mar. 20, 1956 |